(12) United States Patent
Maes

(10) Patent No.: US 9,565,297 B2
(45) Date of Patent: Feb. 7, 2017

(54) TRUE CONVERGENCE WITH END TO END IDENTITY MANAGEMENT

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 99 days.

(21) Appl. No.: 13/029,226

(22) Filed: Feb. 17, 2011

(65) Prior Publication Data
US 2012/0045040 A1    Feb. 23, 2012

Related U.S. Application Data

(60) Provisional application No. 61/305,287, filed on Feb. 17, 2010.

(51) Int. Cl.
*H04L 29/06* (2006.01)
*H04M 3/38* (2006.01)

(52) U.S. Cl.
CPC ............ *H04M 3/38* (2013.01); *H04L 63/0815* (2013.01); *H04L 63/102* (2013.01); *H04L 63/08* (2013.01)

(58) Field of Classification Search
CPC  H04M 7/0024; H04M 3/42136; H04M 15/70; H04L 63/0815; H04L 63/18
USPC ............................................. 379/67.1–88.28
See application file for complete search history.

(56) References Cited

U.S. PATENT DOCUMENTS

| | | |
|---|---|---|
| 5,414,812 A | 5/1995 | Filip et al. |
| 5,613,060 A | 3/1997 | Britton et al. |
| 5,699,513 A | 12/1997 | Feigen et al. |
| 5,786,770 A | 7/1998 | Thompson |
| 5,850,517 A | 12/1998 | Verkler et al. |
| 5,867,665 A | 2/1999 | Butman et al. |
| 5,946,634 A | 8/1999 | Korpela |
| 6,115,690 A | 9/2000 | Wong |
| 6,119,104 A | 9/2000 | Brumbelow et al. |
| 6,128,645 A | 10/2000 | Butman et al. |
| 6,157,941 A | 12/2000 | Verkler et al. |
| 6,163,800 A | 12/2000 | Ejiri |
| 6,192,231 B1 | 2/2001 | Chapman et al. |

(Continued)

FOREIGN PATENT DOCUMENTS

| | | |
|---|---|---|
| EP | 2 034 748 A1 | 3/2009 |
| WO | 2008146097 | 12/2004 |

(Continued)

OTHER PUBLICATIONS

U.S. Appl. 11/951,500, filed Dec. 6, 2007, Notice of Allowance mailed Jul. 23, 2012, 7 pages.

(Continued)

*Primary Examiner* — Amal Zenati
(74) *Attorney, Agent, or Firm* — Kilpatrick Townsend & Stockton LLP

(57) ABSTRACT

Described is a system of disparate telecommunications networks having managed identities, a service, such as voicemail, abstracted from the underlying access networks, and an operational support system (OSS)/business support system (BSS) coupled to the networks to manage authentication and subscription information. A single authentication/subscription manager which is common to the disparate telecommunications networks is enabled by a Service Delivery Platform (SDP) which can be open-standards based and extensible as needed.

20 Claims, 11 Drawing Sheets

(56) References Cited

U.S. PATENT DOCUMENTS

| | | |
|---|---|---|
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,463,462 B1 | 10/2002 | Smith et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,611,867 B1 | 8/2003 | Bowman-Amuah |
| 6,633,560 B1 | 10/2003 | Tiwari et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,823,338 B1 | 11/2004 | Byrne et al. |
| 6,868,413 B1 | 3/2005 | Grindrod et al. |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 6,990,491 B2 | 1/2006 | Dutta et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,051,092 B2 | 5/2006 | Lenz et al. |
| 7,073,055 B1 | 7/2006 | Freed et al. |
| 7,089,317 B2 | 8/2006 | Jeyaraman et al. |
| 7,092,385 B2 | 8/2006 | Gallant et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,333 B1 | 2/2007 | Shafron |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,266,600 B2 | 9/2007 | Fletcher et al. |
| 7,269,162 B1 | 9/2007 | Turner |
| 7,269,431 B1 | 9/2007 | Gilbert |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,454,399 B2 | 11/2008 | Matichuk |
| 7,461,062 B2 | 12/2008 | Stewart et al. |
| 7,467,384 B2 | 12/2008 | Brubacher et al. |
| 7,472,349 B1 | 12/2008 | Srivastava et al. |
| 7,478,416 B2 | 1/2009 | Edson |
| 7,519,076 B2 | 4/2009 | Janssen et al. |
| 7,580,994 B1 | 8/2009 | Fiszman et al. |
| 7,590,696 B1 | 9/2009 | Odell et al. |
| 7,617,521 B2 | 11/2009 | Maes |
| 7,630,953 B2 | 12/2009 | Stauber et al. |
| 7,644,145 B2 | 1/2010 | Rockwell |
| 7,676,813 B2 | 3/2010 | Bisset et al. |
| 7,702,792 B2 | 4/2010 | Shaffer et al. |
| 7,716,310 B2 | 5/2010 | Foti |
| 7,730,129 B2 | 6/2010 | Wang et al. |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,316 B2 | 1/2011 | Maes |
| 7,873,716 B2 | 1/2011 | Maes |
| 7,904,909 B1 | 3/2011 | Reiner et al. |
| 7,925,727 B2 | 4/2011 | Sullivan et al. |
| 8,023,971 B2 | 9/2011 | Egli |
| 8,027,921 B1 | 9/2011 | Boydstun et al. |
| 8,032,920 B2 | 10/2011 | Maes |
| 8,060,067 B2 | 11/2011 | Tarleton et al. |
| 8,068,860 B1 | 11/2011 | Midkiff |
| 8,073,810 B2 | 12/2011 | Maes |
| 8,086,665 B1 | 12/2011 | Soukup et al. |
| 8,090,848 B2 | 1/2012 | Maes |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,321,498 B2 | 11/2012 | Maes |
| 8,321,594 B2 | 11/2012 | Maes et al. |
| 8,335,862 B2 | 12/2012 | Fletcher et al. |
| 8,370,506 B2 | 2/2013 | Maes |
| 8,401,009 B1 | 3/2013 | Dorsey et al. |
| 8,401,022 B2 | 3/2013 | Maes et al. |
| 8,458,703 B2 | 6/2013 | Maes |
| 8,478,311 B2 | 7/2013 | Sennett et al. |
| 8,505,067 B2 | 8/2013 | Maes |
| 8,533,773 B2 | 9/2013 | Maes |
| 8,539,097 B2 | 9/2013 | Maes |
| 8,543,665 B2 | 9/2013 | Ansari et al. |
| 8,589,338 B2 | 11/2013 | Maes |
| 8,675,852 B2 | 3/2014 | Maes |
| 8,676,155 B2 | 3/2014 | Fan et al. |
| 8,744,055 B2 | 6/2014 | Maes |
| 8,849,685 B2 | 9/2014 | Oden |
| 8,918,493 B1 | 12/2014 | Beach et al. |
| 8,966,498 B2 | 2/2015 | Maes |
| 9,038,082 B2 | 5/2015 | Maes |
| 9,083,599 B2 | 7/2015 | Huuhtanen et al. |
| 9,088,570 B2 | 7/2015 | Anderson et al. |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0004827 A1 | 1/2002 | Ciscon et al. |
| 2002/0075844 A1 | 6/2002 | Hagen |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120697 A1 | 8/2002 | Generous et al. |
| 2002/0120729 A1 | 8/2002 | Faccin et al. |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0120502 A1 | 6/2003 | Robb et al. |
| 2003/0131076 A1 | 7/2003 | Nelson et al. |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0182550 A1 | 9/2003 | Chen et al. |
| 2003/0185233 A1 | 10/2003 | Ji et al. |
| 2003/0191769 A1 | 10/2003 | Crisan et al. |
| 2003/0191823 A1 | 10/2003 | Bansal et al. |

(56) References Cited

U.S. PATENT DOCUMENTS

| | | |
|---|---|---|
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0044647 A1 | 3/2004 | Salmenkaita |
| 2004/0054718 A1 | 3/2004 | Hicks, III et al. |
| 2004/0064528 A1 | 4/2004 | Meredith et al. |
| 2004/0068586 A1 | 4/2004 | Xie et al. |
| 2004/0093381 A1 | 5/2004 | Hodges et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley, III et al. |
| 2004/0139319 A1 | 7/2004 | Favazza et al. |
| 2004/0148334 A1 | 7/2004 | Arellano et al. |
| 2004/0153545 A1 | 8/2004 | Pandya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0204391 A1 | 9/2005 | Hunleth et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031441 A1 | 2/2006 | Davis et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0047753 A1* | 3/2006 | Pal ................................ 709/206 |
| 2006/0048159 A1 | 3/2006 | Yazawa et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0146792 A1 | 7/2006 | Ramachandran et al. |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1* | 3/2007 | Hakusui ........................ 370/356 |
| 2007/0061397 A1 | 3/2007 | Gregorat et al. |
| 2007/0071224 A1 | 3/2007 | Shtivelman et al. |
| 2007/0088836 A1* | 4/2007 | Tai et al. ....................... 709/227 |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0123297 A1 | 5/2007 | Chan et al. |
| 2007/0150480 A1* | 6/2007 | Hwang ................... G06Q 10/00 |
| 2007/0150936 A1 | 6/2007 | Maes |
| 2007/0173226 A1 | 7/2007 | Cai et al. |
| 2007/0182541 A1 | 8/2007 | Harris et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0198982 A1 | 8/2007 | Bolan et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0233883 A1 | 10/2007 | De Lutiis et al. |
| 2007/0239866 A1 | 10/2007 | Cox et al. |
| 2007/0255662 A1* | 11/2007 | Tumminaro ......... G06Q 20/027 |
| | | 705/79 |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0163235 A1 | 7/2008 | Marvin et al. |
| 2008/0168523 A1 | 7/2008 | Ansari et al. |
| 2008/0171549 A1 | 7/2008 | Hursey et al. |
| 2008/0172482 A1 | 7/2008 | Shah |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0201715 A1 | 8/2008 | Breiter et al. |
| 2008/0212762 A1 | 9/2008 | Gray et al. |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0271039 A1 | 10/2008 | Rolia et al. |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0293389 A1 | 11/2008 | Chin et al. |
| 2008/0301135 A1 | 12/2008 | Alves et al. |
| 2008/0307108 A1 | 12/2008 | Yan et al. |
| 2008/0313648 A1 | 12/2008 | Wang et al. |
| 2009/0003362 A1 | 1/2009 | Pattabhiraman et al. |

(56) References Cited

U.S. PATENT DOCUMENTS

| | | |
|---|---|---|
| 2009/0006360 A1 | 1/2009 | Liao et al. |
| 2009/0015433 A1 | 1/2009 | James et al. |
| 2009/0022286 A1 | 1/2009 | Brunson et al. |
| 2009/0034426 A1 | 2/2009 | Luft et al. |
| 2009/0061404 A1 | 3/2009 | Toly |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0119672 A1 | 5/2009 | Bussard et al. |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1 | 6/2009 | Kung et al. |
| 2009/0180440 A1 | 7/2009 | Sengupta et al. |
| 2009/0185576 A1 | 7/2009 | Kisel et al. |
| 2009/0187919 A1 | 7/2009 | Maes |
| 2009/0190603 A1 | 7/2009 | Damola et al. |
| 2009/0192992 A1 | 7/2009 | Arthursson |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222836 A1 | 9/2009 | Paval |
| 2009/0222858 A1 | 9/2009 | Hjelm et al. |
| 2009/0228584 A1 | 9/2009 | Maes et al. |
| 2009/0253434 A1 | 10/2009 | Hayashi et al. |
| 2009/0306834 A1 | 12/2009 | Hjelm et al. |
| 2009/0328051 A1 | 12/2009 | Maes |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0179995 A1 | 7/2010 | Wang |
| 2010/0185772 A1 | 7/2010 | Wang et al. |
| 2010/0192004 A1 | 7/2010 | Bauchot et al. |
| 2010/0235844 A1 | 9/2010 | Arwe et al. |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0134843 A1 | 6/2011 | Noldus et al. |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2011/0280383 A1 | 11/2011 | Varga et al. |
| 2012/0047506 A1 | 2/2012 | Maes |
| 2012/0106728 A1 | 5/2012 | Ghaffari et al. |
| 2012/0173745 A1 | 7/2012 | Maes |

FOREIGN PATENT DOCUMENTS

| | | |
|---|---|---|
| WO | WO 2007134468 A1 | 11/2007 |
| WO | 2008111027 | 12/2008 |

OTHER PUBLICATIONS

U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
Seely, Scott, "XML and Web Services Security: Understanding WS-Security," Microsoft Corporation, 2002, 11 pages.
Simpson et al., Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm, accessed May 26, 2003, 5 pages.
Sundsted, Todd E., with Liberty and single sign-on for all, The Liberty Alliance Project seeks to solve the current online identity crisis Java World, www.javaworld.com/javaworld/jw-02-2002/jw-0215-liberty.html, accessed May 26, 2003, 7 pages.
The Parlay Group, "Specifications," <http://web.archive.org/web/20050114014707/www.parlay.org/specs/index.asp>, Jan. 14, 2005, 2 pages.
Thomas, Ann M., "Registering a Web Service in UDDI," SOA World Magazine, Sep. 26, 2003, 9 pages.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/848,347, filed Aug. 31, 2007, Office Action mailed Sep. 30, 2010, 19 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 16, 2010, 3 pages.

(56) References Cited

OTHER PUBLICATIONS

U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Office Action mailed Aug. 27, 2010, 11 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 10/855,999, filed May 28, 2004, Final Office Action dated Jan. 5, 2011, 19 pages.
U.S. Appl. No. 10/855,999, filed May 28, 2004, Advisory Action dated Mar. 16, 2011, 3 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 12/019,335, filed Jan. 24, 2008, Office Action mailed May 23, 2011, 18 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Office Action mailed Mar. 31, 2010, 13 pages.
U.S. Appl. No. 12/019,299, filed Jan. 24, 2008, Office Action mailed Jan. 24, 2011, 16 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.
U.S. Appl. No. 10/855,999, filed May 28, 2004, Final Office Action dated Nov. 18, 2013, 14 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 11/357,653, filed Feb. 16, 2006, Final Office Action dated Nov. 26, 2013, 25 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/018,718, filed Jan. 23, 2008, Advisory Action mailed Nov. 15, 2013, 3 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/949,287, filed Nov. 18, 2010, Final Office Action mailed Nov. 25, 2013, 25 pages.
U.S. Appl. No. 12/957,740, filed Dec. 1, 2010, Non-final Office Action mailed Aug. 15, 2013, 17 pages.
U.S. Appl. No. 12/957,697, filed Dec. 1, 2010 Non-Final Office Action mailed Oct. 1, 2013, 10 pages.
U.S. Appl. No. 13/029,219 filed Feb. 17, 2011, Final Office Action mailed Oct. 11, 2013, 22 pages.
U.S. Appl. No. 11/939,705, filed Nov. 14, 2007, Notice of Allowance mailed May 15, 2013, 92 pages.

(56) References Cited

OTHER PUBLICATIONS

U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/948,247, Non-Final Office Action mailed on May 21, 2014, 18 pages.
U.S. Appl. No. 12/957,697, Advisory Action mailed on May 29, 2014, 2 pages.
U.S. Appl. No. 12/957,740, Advisory Action mailed on May 23, 2014, 3 pages.
U.S. Appl. No. 11/357,653, Final Office Action mailed on Aug. 18, 2014, 15 pages.
U.S. Appl. No. 12/018,718, Non-Final Office Action mailed on Sep. 30, 2014, 50 pages.
U.S. Appl. No. 12/045,220, Notice of Allowance mailed on Aug. 13, 2014, 5 pages.
U.S. Appl. No. 12/544,484, Non-Final Office Action mailed on Aug. 1, 2014, 14 pages.
U.S. Appl. No. 12/791,129, Corrected Notice of Allowability mailed on Oct. 6, 2014, 6 pages.
U.S. Appl. No. 12/949,183, Non-Final Office Action mailed on Sep. 22, 2014, 16 pages.
U.S. Appl. No. 12/949,287, Non-Final Office Action mailed on Sep. 8, 2014, 27 pages.
U.S. Appl. No. 13/029,219, Final Office Action mailed on Sep. 12, 2014, 24 pages.
U.S. Appl. No. 12/957,697, Non-Final Office Action mailed on Jul. 2, 2014, 9 pages.
U.S. Appl. No. 11/357,653 , "Non-Final Office Action" mailed on Mar. 27, 2014, 19 pages.
U.S. Appl. No. 11/969,343 , "Notice of Allowance" mailed on Apr. 9, 2014, 6 pages.
U.S. Appl. No. 12/014,387 , "Corrective Notice of Allowance" mailed on Dec. 18, 2013, 4 pages.
U.S. Appl. No. 12/019,299 , "Notice of Allowance", mailed on Jul. 3, 2013, 6 pages.
U.S. Appl. No. 12/019,335 , "Final Office Action", mailed on Jul. 26, 2013, 19 pages.
U.S. Appl. No. 12/045,220 , "Final Office Action", mailed on Apr. 18, 2014, 20 pages.
U.S. Appl. No. 12/544,484 , "Non-Final Office Action", mailed on May 8, 2014, 13 pages.
U.S. Appl. No. 12/791,129 , "Advisory Action", mailed on Mar. 6, 2014, 3 pages.
U.S. Appl. No. 12/791,129 , "Notice of Allowance", mailed on Apr. 24, 2014, 9 pages.
U.S. Appl. No. 12/949,183 , "Advisory Action", mailed on Apr. 10, 2014, 3 pages.
U.S. Appl. No. 12/949,287 , "Non-Final Office Action", mailed on Nov. 19, 2012, 32 pages.
U.S. Appl. No. 12/957,697 , "Non-Final Office Action", mailed on Mar. 20, 2014, 12 pages.
U.S. Appl. No. 12/957,740 , "Final Office Action", mailed on Feb. 19, 2014, 18 pages.
U.S. Appl. No. 13/029,219 , "Non-Final Office Action", mailed on Apr. 11, 2014, 23 pages.
Maffioletti et al., "Automatic resource and service management for ubiquitous computing environments", Pervasive Computing and Communications Workshops, Proceedings of the Second IEEE Annual Conference on IEEE, 2004,.
Simon et al., "A simple query interface for interoperable learning repositories", In Proceedings of the 1st Workshop on Interoperability of Web-based Educational Systems, 2005, pp. 11-18.
U.S. Appl. No. 12/019,335, filed Jan. 24, 2008, Final Office Action mailed Jan. 14, 2014, 33 pages.
U.S. Appl. No. 11/969,343, filed Jan. 4, 2008, Notice of Allowance mailed Jan. 16, 2014, 6 pages.
U.S. Appl. No. 12/791,129, filed Jun. 1, 2010, Final Office Action mailed Dec. 20, 2013, 10 pages.
U.S. Appl. No. 13/029,219, filed Feb. 17, 2011, Advisory Action mailed Jan. 2, 2014, 3 pages.
U.S. Appl. No. 12/949,183, filed Nov. 18, 2010, Final Office Action mailed Jan. 21, 2014, 19 pages.
U.S. Appl. No. 11/123,468, Non-Final Office Action mailed on Jan. 30, 2015, 19 pages.
U.S. Appl. No. 12/544,484, Advisory Action mailed on Mar. 10, 2015, 3 pages.
U.S. Appl. No. 12/544,484, Final Office Action mailed on Dec. 26, 2014, 12 pages.
U.S. Appl. No. 12/948,247, Advisory Action mailed on Mar. 6, 2015, 3 pages.
U.S. Appl. No. 12/949,183, Advisory Action mailed on Mar. 26, 2015, 3 pages.
U.S. Appl. No. 12/949,183, Final Office Action mailed on Jan. 22, 2015, 16 pages.
U.S. Appl. No. 12/949,287, Advisory Action mailed on Mar. 10, 2015, 3 pages.
U.S. Appl. No. 12/949,287, Final Office Action mailed on Dec. 23, 2014, 27 pages.
U.S. Appl. No. 12/957,697, Advisory Action mailed on Feb. 3, 2015, 3 pages.
U.S. Appl. No. 12/957,697, Non-Final Office Action mailed on Mar. 6, 2015, 11 pages.
U.S. Appl. No. 12/957,740, Non-Final Office Action mailed on Feb. 13, 2015, 17 pages.
U.S. Appl. No. 13/029,219, Notice of Allowance mailed on Jan. 22, 2015, 12 pages.
U.S. Appl. No. 11/357,653, Notice of Allowance mailed on Oct. 5, 2015, 16 pages.
U.S. Appl. No. 11/357,653, Notice of Allowance mailed on Sep. 11, 2015, 19 pages.
U.S. Appl. No. 12/948,247, Notice of Allowance mailed on Oct. 13, 2015, 8 pages.
U.S. Appl. No. 12/949,183, Non-Final Office Action mailed on Sep. 16, 2015, 15 pages.
U.S. Appl. No. 12/949,287, Non-Final Office Action mailed on Sep. 18, 2015, 29 pages.
U.S. Appl. No. 12/957,697, Advisory Action mailed on Aug. 25, 2015, 2 pages.
U.S. Appl. No. 12/957,697, Non-Final Office Action mailed on Oct. 15, 2015, 13 pages.
U.S. Appl. No. 12/957,740, Final Office Action mailed on Aug. 12, 2015, 18 pages.
U.S. Appl. No. 10/855,999, Non-Final Office Action mailed on Jun. 17, 2015, 16 pages.
U.S. Appl. No. 12/018,718, Final Office Action mailed Jun. 30, 2015, 22 pages.
U.S. Appl. No. 12/957,697, Final Office Action mailed on Jun. 18, 2015, 12 pages.
U.S. Appl. No. 11/848,347, filed Aug. 31, 2007 now U.S. Pat. No. 8,214,503 issued Jul. 3, 2012.
U.S. Appl. No. 11/877,129, filed Oct. 23, 2007 now U.S. Pat. No. 7,853,647 issued Dec. 14, 2010.
U.S. Appl. No. 11/926,738, filed Oct. 29, 2007 now U.S. Pat. No. 8,073,810 issued Dec. 6, 2011.
U.S. Appl. No. 11/943,101, filed Nov. 20, 2007 now U.S. Pat. No. 8,161,171 issued Apr. 17, 2012.
U.S. Appl. No. 11/951,500, filed Dec. 6, 2007 now U.S. Pat. No. 8,321,594 issued Nov. 27, 2012.
U.S. Appl. No. 10/855,999, filed May 28, 2004.

(56) References Cited

OTHER PUBLICATIONS

U.S. Appl. No. 10/856,588, filed May 28, 2004 now U.S. Pat. No. 7,873,716 issued Jan. 18, 2011.
U.S. Appl. No. 11/070,317, filed Mar. 1, 2005 now U.S. Pat. No. 8,321,498 issued Nov. 27, 2012.
U.S. Appl. No. 11/024,160, filed Dec. 27, 2004 now U.S. Pat. No. 8,032,920 issued Oct. 4, 2011.
U.S. Appl. No. 11/123,468, filed May 5, 2005.
U.S. Appl. No. 11/123,471, filed May 5, 2005 now U.S. Pat. No. 7,617,521 issued Nov. 10, 2009.
U.S. Appl. No. 11/130,636, filed May 16, 2005 now U.S. Pat. No. 7,860,490 issued Dec. 28, 2010.
U.S. Appl. No. 11/939,705, filed Nov. 14, 2007 now U.S. Pat. No. 8,539,097 issued Sep. 17, 2013.
U.S. Appl. No. 12/045,220, filed Mar. 10, 2008.
U.S. Appl. No. 12/019,335, filed Jan. 24, 2008.
U.S. Appl. No. 12/364,642, filed Feb. 3, 2009 now U.S Pat. No. 8,401,022 issued Mar. 19, 2013.
U.S. Appl. No. 11/357,653, filed Feb. 16, 2006.
U.S. Appl. No. 12/544,459, filed Aug. 20, 2009 now U.S. Pat. No. 8,090,848 issued Jan. 3, 2012.
U.S. Appl. No. 12/544,471, filed Aug. 20, 2009 now U.S. Pat. No. 8,505,067 issued Aug. 6, 2013.
U.S. Appl. No. 12/544,484, filed Aug. 20, 2009.
U.S. Appl. No. 12/490,540, filed Jun. 24, 2009 now U.S. Pat. No. 8,458,703 issued Jun. 4, 2013.
U.S. Appl. No. 11/949,930, filed Dec. 4, 2007 now U.S. Pat. No. 8,230,449 issued Jul. 24, 2012.
U.S. Appl. No. 11/969,343, filed Jan. 4, 2008.
U.S. Appl. No. 12/014,387, filed Jan. 15, 2008.
U.S. Appl. No. 12/018,718, filed Jan. 23, 2008.
U.S. Appl. No. 12/019,299, filed Jan. 24, 2008 now U.S. Pat. No. 8,589,338 issued Nov. 19, 2013.
U.S. Appl. No. 12/791,129, filed Jun. 1, 2010.
U.S. Appl. No. 12/948,247, filed Nov. 17, 2010.
U.S. Appl. No. 12/948,450, filed Nov. 17, 2010 now U.S. Pat. No. 8,533,773 issued Sep. 10, 2013.
U.S. Appl. No. 12/949,183, filed Nov. 18, 2010.
U.S. Appl. No. 12/949,287, filed Nov. 18, 2010.
U.S. Appl. No. 12/957,697, filed Dec. 1, 2010.
U.S. Appl. No. 12/957,740, filed Dec. 1, 2010.
U.S. Appl. No. 13/029,219, filed Feb. 17, 2011.
U.S. Appl. No. 13/416,413, filed Mar. 9, 2012 now U.S. Pat. No. 8,370,506 issued Feb. 5, 2013.
U.S. Appl. No. 11/848,347, Jul. 27, 2010, Advisory Action.
U.S. Appl. No. 11/848,347, May 10, 2010, Final Office Action.
U.S. Appl. No. 11/848,347, Non-Final Office Action.
U.S. Appl. No. 11/848,347, Sep. 30, 2010, Non-Final Office Action.
U.S. Appl. No. 11/848,347, Mar. 7, 2011, Final Office Action.
U.S. Appl. No. 11/848,347, May 23, 2011, Advisory Action.
U.S. Appl. No. 11/848,347, Mar. 2, 2012, Notice of Allowance.
U.S. Appl. No. 11/877,129, Jun. 3, 2010, Advisory Action.
U.S. Appl. No. 11/877,129, Mar. 29, 2010, Final Office Action.
U.S. Appl. No. 11/877,129, Aug. 5, 2010, Notice of Allowance.
U.S. Appl. No. 11/877,129, Sep. 28, 2009, Non-Final Office Action.
U.S. Appl. No. 11/926,738, Jun. 29, 2010, Final Office Action.
U.S. Appl. No. 11/926,738, Feb. 24, 2010, Non-Final Office Action.
U.S. Appl. No. 11/926,738, Sep. 3, 2010, Advisory Action.
U.S. Appl. No. 11/926,738, Nov. 10, 2011, Non-Final Office Action.
U.S. Appl. No. 11/926,738, Mar. 17, 2011, Final Office Action.
U.S. Appl. No. 11/926,738, May 25, 2011, Advisory Action.
U.S. Appl. No. 11/926,738, Aug. 5, 2011, Notice of Allowance.
U.S. Appl. No. 11/943,101, Feb. 2, 1010, Final Office Action.
U.S. Appl. No. 11/943,101, Jul. 8, 2009, Non-Final Office Action.
U.S. Appl. No. 11/943,101, Apr. 16, 2010, Advisory Action.
U.S. Appl. No. 11/943,101, Aug. 27, 2010, Non-Final Office Action.
U.S. Appl. No. 11/943,101, Feb. 14, 2011, Final Office Action.
U.S. Appl. No. 11/943,101, Apr. 28, 2011, Advisory Action.
U.S. Appl. No. 11/943,101, Jul. 28, 2011, Non-Final Office Action.
U.S. Appl. No. 11/943,101, Dec. 9, 2011, Notice of Allowance.

U.S. Appl. No. 11/951,500, Jun. 24, 2010, Advisory Action.
U.S. Appl. No. 11/951,500, Mar. 30, 2010, Final Office Action.
U.S. Appl. No. 11/951,500, Sep. 22, 2009, Non-Final Office Action.
U.S. Appl. No. 11/951,500, Sep. 1, 2010, Non-Final Office Action.
U.S. Appl. No. 11/951,500, Apr. 14, 2011, Final Office Action.
U.S. Appl. No. 11/951,500, Jul. 15, 2011, Advisory Action.
U.S. Appl. No. 11/951,500, Apr. 11, 2012, Non-Final Office Action.
U.S. Appl. No. 11/951,500, Jul. 23, 2012, Notice of Allowance.
U.S. Appl. No. 10/855,999, Mar. 28, 2013, Non-Final Office Action.
U.S. Appl. No. 10/855,999, Mar. 18, 2011, Advisory Action.
U.S. Appl. No. 10/855,999, Feb. 16, 2010, Advisory Action.
U.S. Appl. No. 10/855,999, Feb. 2, 2009, Advisory Action.
U.S. Appl. No. 10/855,999, Nov. 19, 2008, Final Office Action.
U.S. Appl. No. 10/855,999, Nov. 23, 2009, Final Office Action.
U.S. Appl. No. 10/855,999, Apr. 15, 2009, Non-Final Office Action.
U.S. Appl. No. 10/855,999, May 1, 2008, Non-Final Office Action.
U.S. Appl. No. 10/855,999, Jun. 24, 2010, Non-Final Office Action.
U.S. Appl. No. 10/855,999, Jan. 1, 2011, Final Office Action.
U.S. Appl. No. 10/855,999, Nov. 18, 2013, Final Office Action.
U.S. Appl. No. 10/855,999, Jun. 17, 2015, Non-Final Office Action.
U.S. Appl. No. 10/856,588, Jan. 5, 2010, Advisory Action.
U.S. Appl. No. 10/856,588, Oct. 15, 2008, Final Office Action.
U.S. Appl. No. 10/856,588, Oct. 20, 2009, Final Office Action.
U.S. Appl. No. 10/856,588, Sep. 23, 2010, Notice of Allowance.
U.S. Appl. No. 10/856,588, Mar. 16, 2009, Non-Final Office Action.
U.S. Appl. No. 10/856,588, Apr. 11, 2008, Non-Final Office Action.
U.S. Appl. No. 11/070,317, Oct. 19, 2012, Notice of Allowance.
U.S. Appl. No. 11/070,317, Sep. 4, 2012, Notice of Allowance.
U.S. Appl. No. 11/070,317, Mar. 15, 2012, Non-Final Office Action.
U.S. Appl. No. 11/070,317, Sep. 27, 2010, Final Office Action.
U.S. Appl. No. 11/070,317, Apr. 30, 2010, Non-Final Office Action.
U.S. Appl. No. 11/070,317, Feb. 2, 2010, Final Office Action.
U.S. Appl. No. 11/070,317, Aug. 18, 2009, Non-Final Office Action.
U.S. Appl. No. 11/070,317, May 19, 2009, Advisory Action.
U.S. Appl. No. 11/070,317, Mar. 4, 2009, Final Office Action.
U.S. Appl. No. 11/070,317, Aug. 5, 2008, Non-Final Office Action.
U.S. Appl. No. 11/024,160, Feb. 7, 2011, Non-Final Office Action.
U.S. Appl. No. 11/024,160, Feb. 18, 2010, Advisory Action.
U.S. Appl. No. 11/024,160, Oct. 15, 2010, Final Office Action.
U.S. Appl. No. 11/024,160, Dec. 3, 2009, Final Office Action.
U.S. Appl. No. 11/024,160, Feb. 11, 2009, Final Office Action.
U.S. Appl. No. 11/024,160, Jun. 29, 2009, Non-Final Office Action.
U.S. Appl. No. 11/024,160, Jun. 9, 2010, Non-Final Office Action.
U.S. Appl. No. 11/024,160, Aug. 22, 2008, Non-Final Office Action.
U.S. Appl. No. 11/024,160, Jun. 1, 2011, Final Office Action.
U.S. Appl. No. 11/024,160, Aug. 4, 2011, Notice of Allowance.
U.S. Appl. No. 11/123,468, Feb. 17, 2010, Advisory Action.
U.S. Appl. No. 11/123,468, Nov. 10, 2010, Final Office Action.
U.S. Appl. No. 11/123,468, Nov. 24, 2009, Final Office Action.
U.S. Appl. No. 11/123,468, Apr. 10, 2009, Non-Final Office Action.
U.S. Appl. No. 11/123,468, Apr. 14, 2010, Non-Final Office Action.
U.S. Appl. No. 11/123,468, Jan. 18, 2011, Advisory Action.
U.S. Appl. No. 11/123,468, Jun. 10, 2014, Non-Final Office Action.
U.S. Appl. No. 11/123,471, Jun. 29, 2009, Notice of Allowance.
U.S. Appl. No. 11/123,471, Jan. 23, 2009, Non-Final Office Action.
U.S. Appl. No. 11/130,636, Aug. 18, 2010, Notice of Allowance.
U.S. Appl. No. 11/130,636, Mar. 23, 2010, Non-Final Office Action.
U.S. Appl. No. 11/130,636, Sep. 18, 2009, Non-Final Office Action.
U.S. Appl. No. 11/939,705, Oct. 4, 2010, Non-Final Office Action.
U.S. Appl. No. 11/939,705, Mar. 16, 2011, Final Office Action.
U.S. Appl. No. 11/939,705, Sep. 28, 2011, Non-Final Office Action.
U.S. Appl. No. 11/939,705, Mar. 15, 2012, Final Office Action.
U.S. Appl. No. 11/939,705, Jun. 1, 2012, Advisory Action.
U.S. Appl. No. 11/939,705, Jul. 6, 2012, Non-Final Office Action.
U.S. Appl. No. 11/939,705, Dec. 5, 2012, Final Office Action.
U.S. Appl. No. 11/939,705, May 15, 2013, Notice of Allowance.
U.S. Appl. No. 12/045,220, May 31, 2012, Advisory Action.
U.S. Appl. No. 12/045,220, Mar. 15, 2012, Final Office Action.
U.S. Appl. No. 12/045,220, Sep. 27, 2011, Non-Final Office Action.
U.S. Appl. No. 12/045,220, Jun. 11, 2010, Advisory Action.
U.S. Appl. No. 12/045,220, Apr. 2, 2010, Final Office Action.
U.S. Appl. No. 12/045,220, Oct. 2, 2009, Non-Final Office Action.
U.S. Appl. No. 12/045,220, Oct. 7, 2013, Non-Final Office Action.

(56) References Cited

OTHER PUBLICATIONS

U.S. Appl. No. 12/045,220, Apr. 18, 2014, Final Office Action.
U.S. Appl. No. 12/045,220, Aug. 13, 2014, Notice of Allowance.
U.S. Appl. No. 12/019,335, May 23, 2011, Non-Final Office Action.
U.S. Appl. No. 12/019,335, Dec. 5, 2011, Final Office Action.
U.S. Appl. No. 12/019,335, Feb. 27, 2012, Advisory Action.
U.S. Appl. No. 12/019,335, Jan. 14, 2014, Final Office Action.
U.S. Appl. No. 12/019,335, Jul. 26, 2013, Final Office Action.
U.S. Appl. No. 12/019,335, Jun. 11, 2014, Notice of Allowance.
U.S. Appl. No. 12/364,642, Dec. 20, 2010, Non-Final Office Action.
U.S. Appl. No. 12/364,642, Jul. 1, 2011, Final Office Action.
U.S. Appl. No. 12/364,642, Sep. 16, 2011, Advisory Action.
U.S. Appl. No. 12/364,642, Oct. 18, 2011, Non-Final Office Action.
U.S. Appl. No. 12/364,642, Jun. 19, 2012, Final Office Action.
U.S. Appl. No. 12/364,642, Sep. 14, 2012, Advisory Action.
U.S. Appl. No. 12/364,642, Nov. 14, 2012, Notice of Allowance.
U.S. Appl. No. 11/357,653, Jan. 1, 2011, Non-Final Office Action.
U.S. Appl. No. 11/357,653, Aug. 2, 2011, Final Office Action.
U.S. Appl. No. 11/357,653, Oct. 12, 2011, Advisory Action.
U.S. Appl. No. 11/357,653, Apr. 26, 2012, Non-Final Office Action.
U.S. Appl. No. 11/357,653, Sep. 21, 2012, Final Office Action.
U.S. Appl. No. 11/357,653, Dec. 4, 2012, Advisory Action.
U.S. Appl. No. 11/357,653, Jul. 11, 2013, Non-Final Office Action.
U.S. Appl. No. 11/357,653, Nov. 26, 2013, Final Office Action.
U.S. Appl. No. 11/357,653, Mar. 27, 2014, Non-Final Office Action.
U.S. Appl. No. 11/357,653, Aug, 18, 2014, Final Office Action.
U.S. Appl. No. 12/544,459, Mar. 2, 2011, Non-Final Office Action.
U.S. Appl. No. 12/544,459, Aug. 22, 2011, Notice of Allowance.
U.S. Appl. No. 12/544,471, Jan. 6, 2012, Non-Final Office Action.
U.S. Appl. No. 12/544,471, Jul. 30, 2012, Final Office Action.
U.S. Appl. No. 12/544,471, Nov. 9, 2012, Advisory Action.
U.S. Appl. No. 12/544,471, Mar. 12, 2013, Notice of Allowance.
U.S. Appl. No. 12/544,484, Feb. 9, 2012, Advisory Action.
U.S. Appl. No. 12/544,484, Jun. 30, 2011, Non-Final Office Action.
U.S. Appl. No. 12/544,484, Dec. 1, 2011, Final Office Action.
U.S. Appl. No. 12/544,484, May 8, 2014, Non-Final Office Action.
U.S. Appl. No. 12/544,484, Aug. 1, 2014, Non-Final Office Action.
U.S. Appl. No. 12/490,540, Jul. 6, 2012, Non-Final Office Action.
U.S. Appl. No. 12/490,540, Feb. 4, 2013, Notice of Allowance.
U.S. Appl. No. 11/949,930, Sep. 29, 2011, Non-Final Office Action.
U.S. Appl. No. 11/949,930, Mar. 19, 2012, Notice of Allowance.
U.S. Appl. No. 11/969,343, Jun. 10, 2011, Non-Final Office Action.
U.S. Appl. No. 11/969,343, Oct. 21, 2011, Final Office Action.
U.S. Appl. No. 11/969,343, Jan. 5, 2012, Advisory Action.
U.S. Appl. No. 11/969,343, Jan. 6, 2014, Notice of Allowance.
U.S. Appl. No. 12/014,387, Sep. 7, 2011, Non-Final Office Action.
U.S. Appl. No. 12/014,387, Apr. 5, 2012, Final Office Action.
U.S. Appl. No. 12/014,387, Jun. 15, 2012, Advisory Action.
U.S. Appl. No. 12/014,387, Oct. 25, 2013, Notice of Allowance.
U.S. Appl. No. 12/014,387, Dec. 18, 2013, Corrected Notice of Allowance.
U.S. Appl. No. 12/018,718, Jun. 22, 2011, Non-Final Office Action.
U.S. Appl. No. 12/018,718, Feb. 1, 2012, Final Office Action.
U.S. Appl. No. 12/018,718, Apr. 24, 2013, Non-Final Office Action.
U.S. Appl. No. 12/018,718, Sep. 10, 2013, Final Office Action.
U.S. Appl. No. 12/018,718, Nov. 15, 2013, Advisory Action.
U.S. Appl. No. 12/018,718, Sep. 30, 2014, Non-Final Office Action.
U.S. Appl. No. 12/018,718, Jun. 30, 2015, Final Office Action.
U.S. Appl. No. 12/019,299, Dec. 9, 2010, Advisory Action.
U.S. Appl. No. 12/019,299, Oct. 6, 2010, Final Office Action.
U.S. Appl. No. 12/019,299, Mar. 31, 2010, Non-Final Office Action.
U.S. Appl. No. 12/019,299, Jan. 24, 2011, Non-Final Office Action.
U.S. Appl. No. 12/019,299, Aug. 25, 2011, Final Office Action.
U.S. Appl. No. 12/019,299, Nov. 3, 2011, Advisory Action.
U.S. Appl. No. 12/019,299, Feb. 16, 2012, Non-Final Office Action.
U.S. Appl. No. 12/019,299, Aug. 15, 2012, Final Office Action.
U.S. Appl. No. 12/019,299, Oct. 29, 2012, Advisory Action.
U.S. Appl. No. 12/019,299, Dec. 7, 2012, Non-Final Office Action.
U.S. Appl. No. 12/019,299, Jul. 3, 2013, Notice of Allowance.
U.S. Appl. No. 12/948,247, Jul. 6, 2012, Non-Final Office Action.
U.S. Appl. No. 12/948,247, Feb. 11, 2013, Final Office Action.
U.S. Appl. No. 12/948,247, May 21, 2014, Non-Final Office Action.
U.S. Appl. No. 12/948,247, Nov. 25, 2014, Final Office Action.
U.S. Appl. No. 12/948,450, Nov. 7, 2012, Non-Final Office Action.
U.S. Appl. No. 12/948,450, May 10, 2013, Notice of Allowance.
U.S. Appl. No. 12/791,129, Jul. 10, 2012, Non-Final Office Action.
U.S. Appl. No. 12/791,129, Dec. 7, 2012, Final Office Action.
U.S. Appl. No. 12/791,129, Sep. 11, 2013, Non-Final Office Action.
U.S. Appl. No. 12/791,129, Dec. 20, 2013, Final Office Action.
U.S. Appl. No. 12/791,129, Mar. 6, 2014, Advisory Action.
U.S. Appl. No. 12/791,129, Apr. 24, 2014, Notice of Allowance.
U.S. Appl. No. 12/791,129, Oct. 6, 2014, Corrected Notice of Allowance.
U.S. Appl. No. 12/949,287, Nov., 19, 2012, Non-Final Office Action.
U.S. Appl. No. 12/949,287, Apr. 23, 2013, Final Office Action.
U.S. Appl. No. 12/949,287, Aug. 8, 2013, Non-Final Office Action.
U.S. Appl. No. 12/949,287, Nov. 25, 2013, Final Office Action.
U.S. Appl. No. 12/949,287, Nov. 19, 2012, Non-Final Office Action.
U.S. Appl. No. 12/949,287, Sep. 8, 2014, Non-Final Office Action.
U.S. Appl. No. 12/949,183, Nov. 16, 2012, Non-Final Office Action.
U.S. Appl. No. 12/949,183, Apr. 17, 2013, Final Office Action.
U.S. Appl. No. 12/949,183, Jun. 28, 2013, Advisory Action.
U.S. Appl. No. 12/949,183, Sep. 9, 3023, Non-Final Office Action.
U.S. Appl. No. 12/949,183, Jan. 21, 2014, Final Office Action.
U.S. Appl. No. 12/949,183, Sep. 22, 2014, Non-Final Office Action.
U.S. Appl. No. 12/957,697, Oct. 1, 2013, Non-Final Office Action.
U.S. Appl. No. 12/957,697, Mar. 20, 2014, Non-Final Office Action.
U.S. Appl. No. 12/957,697, May 29, 2014, Advisory Action.
U.S. Appl. No. 12/957,697, Jul. 2, 2014, Non-Final Office Action.
U.S. Appl. No. 12/957,697, Nov. 26, 2014, Final Office Action.
U.S. Appl. No. 12/957,697, Jun. 18, 2015, Final Office Action.
U.S. Appl. No. 12/957,740, Oct. 17, 2012, Non-Final Office Action.
U.S. Appl. No. 12/957,740, Feb. 15, 2013, Final Office Action.
U.S. Appl. No. 12/957,740, May 21, 2013, Advisory Action.
U.S. Appl. No. 12/957,740, Aug. 15, 2013, Non-Final Office Action.
U.S. Appl. No. 12/957,740, Feb. 19, 2014, Final Office Action.
U.S. Appl. No. 12/957,740, May 23, 2014, Advisory Action.
U.S. Appl. No. 13/029,219, Mar. 20, 2013, Non-Final Office Action.
U.S. Appl. No. 13/029,219, Oct. 11, 2013, Final Office Action.
U.S. Appl. No. 13/029,219, Jan. 2, 2014, Advisory Action.
U.S. Appl. No. 13/029,219, Apr. 11, 2014, Non-Final Office Action.
U.S. Appl. No. 13/029,219, Sep. 12, 2014, Final Office Action.
U.S. Appl. No. 13/416,413, Apr. 27, 2012, Non-Final Office Action.
U.S. Appl. No. 13/416,413, Oct. 2, 2012, Notice of Allowance.
U.S. Appl. No. 11/024,160, Dec, 27, 2004, Maes.
Andrews, Tony et al., Business Process Execution Language for Web Services, Version 1.1, BEA Systems, International Business Machines Corporation, SAP AG, Siebel Systems, May 5, 2003, 31 pages.
Burger, E. et al., "Deploying CCXML for Application-Layer Call Control," Aug. 2006, 11 pages.
International Search Report and Written Opinion of PCT/US2010/037074 mailed Jun. 1, 2011, 16 pages.
Kim et al., "Implementation of Third Party Based Call Control using Parlay Network API in SIP Environment," ICOIN 2003, LNCS 2662, 2003, pp. 416-425.
Liberty Architecture Overview, Liberty Alliance Project Version 1.1, Piscataway New Jersey, Jan. 15, 2003, 44 pages.
Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.
Maes, Stephane, Multi-modal Web IBM Position W3C/WAP Workshop, IBM Research Human Language Technologies, http://www.w3.org, accessed May 26, 2003, 9 pages.
Maretzke, Michael, "Jain Slee Technology Overview," <http://www.maretzke.de/pub/lectures/jslee_overview_2005/JSLEE_Overview_2005.pdf>, Apr. 12, 2005, 26 pages.
O'Doherty, Phelim, "JSLEE --SIP Servlet," <http://java.sun.com/products/jain/JSLEE-SIPServlet.pdf, 2003, 13 pages.
Parlay APIs 4.0, Parlay X Web Services White Paper, the Parlay Group, Parlay X Working Group, Dec. 16, 2002, 12 pages.

(56) References Cited

OTHER PUBLICATIONS

Policy-Based Management Tom Sheldon's Linktionary, http://www.linktionary.com/policy.html, accessed Aug. 2, 2004, 4 pages.
Romellini, C. et al., "CCXML:Tthe Power of Standardization," Loquendo, Sep. 27, 2005, 7 pages.
U.S. Appl. No. 11/848,347, filed Aug. 31, 2007, Final Office Action mailed Mar. 7, 2011, 21 pages.
U.S. Appl. No. 11/848,347, filed Aug. 31, 2007, Advisory Action mailed May 23, 2011, 3 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Notice of Allowance mailed Aug. 5, 2010, 6 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed Feb. 24, 2010, 12 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 11/951,500, filed Dec. 6, 2007, Office Action mailed Sep. 22, 2009, 24 pages.
U.S. Appl. No. 11/951,500, filed Dec. 6, 2007, Office Action mailed Sep. 1, 2010, 30 pages.
U.S. Appl. No. 11/951,500, filed Dec. 6, 2007, Final Office Action mailed Apr. 14, 2011, 33 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/024,160, filed Dec. 27, 2004, Final Office Action dated Jun. 1, 2011, 11 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Final Office Action mailed Mar. 17, 2011, 21 pages.
U.S. Appl. No. 12/045,220, filed Mar. 10, 2008, Advisory Action dated Jun. 11, 2010, 3 pages.
U.S. Appl. No. 12/045,220 filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 12/364,642, filed Feb. 3, 2009, Advisory Action dated Sep. 16, 2011, 3 pages.
U.S. Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 11/949,930, filed Dec. 4, 2007, Office Action mailed Sep. 29, 2011, 19 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
Author Unknown, "Assuring Quality of Experience for IPTV—White Paper," Heavy Reading, Jul. 2006, 18 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.

\* cited by examiner

TRUE CONVERGENCE WITH END TO END IDENTITY MANAGEMENT

CROSS-REFERENCES TO RELATED APPLICATIONS

The present application claims benefit under 35 USC 119(e) of U.S. Provisional Application No. 61/305,287, filed on Feb. 17, 2010 by Maes and entitled "True Convergence with End-to-End Identity Management," of which the entire disclosure is incorporated herein by reference for all purposes.

This application is also related to U.S. patent application Ser. No. 10/856,560 filed May 28, 2004 issued as U.S. Pat. No. 7,167,705; co-pending U.S. patent application Ser. No. 11/357,653 filed Feb. 16, 2006; co-pending U.S. patent application Ser. No. 11/926,738 filed Oct. 29, 2007; and co-pending U.S. patent application Ser. No. 12/019,335 filed Jan. 24, 2008. All the above references are by the same inventor as the present application and are hereby incorporated by reference in their entireties for all purposes.

BACKGROUND OF THE INVENTION

The present disclosure relates generally to the management of telecommunication services in telecommunications networks, and in particular to common user authentication and subscription management on disparate telecommunication networks for various telecommunication services.

A telecommunications network can be of several types, including mobile telecommunications networks and fixed telecommunications networks. Mobile telecommunication networks can include telecommunications networks hosted on networks of cellular stations and mobile telephones, pagers, radio-devices, and other infrastructure and portable devices which allow a user to communicate wirelessly. Mobile telecommunications networks also include those networks hosted on satellites and portable ground stations, vehicle-mounted communications gear, and handheld devices. Other mobile telecommunications networks are also available. Fixed telecommunications networks can include telecommunications networks hosted on public switched telephone networks (PSTN), land lines, and wired infrastructure within businesses and homes. Fixed telecommunications networks can also include those hosted over the Internet or local internets connecting computers, network appliances, Voice over Internet Protocol (VoIP) telephones, and other devices. Telecommunication networks can also include a hybrid of fixed and mobile networks, such as wired networks which reconfigure so that a user can move between wired nodes and connect and reconnect by wire or wirelessly to the network as if the user were on one network. Telecommunications networks are typically provided by network providers.

Telecommunications services, sometimes referred to as simply "services," can include services such as voice mail, call conferencing, presence detection, and call hunting. Presence detection and call hunting services include the process of determining a phone number (or IP address) which a target user is using or has recently used in order to forward calls to that number. Services are typically provided by service providers.

An Operations Support System (OSS) is a computer system which supports processing in a telecommunications network, such as maintaining network inventory, provisioning services, configuring network components, and managing faults. A Business Support System (BSS) is a computer system which may interface with customers, take orders, process bills, and collect payments. An OSS and a BSS can run on the same computer or computers and may be integrated with each other. An OSS and BSS can have separate or shared database repositories.

A BSS repository can store customer information from a service provider point of view, such as customer address information, customer billing information, products purchased by the customer, and campaigns to which a customer has responded. A BSS repository also can include subscription information for a customer, such as information for any voice, wireless, or roaming plan, as well as number of minutes purchased per month, etc. Such information is treated as product information from a BSS point of view, and the BSS repository also will include information as to whether a particular customer is subscribing to that product. If, for example, a customer subscribing to a new subscription is entitled to a new phone, that information typically will be maintained in the BSS repository. A BSS repository also typically is used to maintain trouble tickets, such as information regarding problems with service or failure to receive a form, as well as maintaining security credentials.

An OSS repository, on the other hand, is used for monitoring and administration of the system or other OSS operations such as charging/rating and activation provisioning. An OSS repository can also contain subscriber information such as information for the current and active bill for a customer, an inventory of assets associated with a customer, types of products or services provided to a customer, etc. A repository at the network level might include current network information for a customer, such as whether the customer is logged onto the network, a location of the customer on the network, whether a customer device is active, etc.

A service resource such as a Service Delivery Platform (SDP) repository stores subscription information for a customer that is useful in running software services that are exposed to the customer, such as whether a particular customer has requested to receive news updates, and if so, also stores preference information such as which types of news the customer wishes to receive, e.g., international news or news related to a specific topic, as well as a channel in which to receive the news (e.g., Short Message Service (SMS) or Multimedia Messaging Service (MMS)) and format information for the news (e.g., background color and font size). The SDP repository also can include information such as an identity for each customer, credentials, customer availability, etc.

In the lexicon of telecommunications, "convergence" typically means that a service provider offers different networks (e.g., fixed, mobile, wireless, broadband) and offers the same services on the different networks. Also, the different networks may be provided by partnering network providers.

It is often understood that convergence uses IP (Internet Protocol) Multimedia System (IMS). IMS offers a common set of network, transport, and session layers independent of the bearer of services.

IMS is sometimes considered the architecture for Next Generation Networks (NGN). IMS is built on IP standards such as Session Initiation Protocol (SIP) and Diameter. In the network layer, a core SIP network handles routing and location lookup. In the application layer, SIP application servers provide services.

IMS generally standardizes the network layer infrastructure and application layer on vanilla Internet Engineering Task Force (IETF)-standardized SIP. The standardization of the network layer infrastructure and application layer uses the SIP/IP core and SIP session layer, respectively.

The telecommunications industry is specifying and promoting new networks (such as NGNs or Next Generation Networks) that aim to provide support for the latest technologies (e.g., VoIP, multimedia streaming and messaging, and web 2.0) and an Internet-like user experience with viable business models for the operators. These networks can be used to provide new, attractive, and revenue generating multimedia ad real time services, for example. IMS (IP Multimedia Subsystem) is the most widely known example of such a new network technology. With its layered architecture, IMS provides the ability to deploy new exciting services (e.g., VoIP, Multimedia streaming and messaging and web 2.0), as well as convergence (e.g. Voice Call Continuity (VCC)), making these services available through multiple access networks, such as FMC (Fix Mobile Convergence) where the services are available through mobile and wired networks. Of course, the Internet is the other mainstream of NGN that enables web 2.0 services in general.

An example of a new and exciting service is triple play (voice+data+video) and quadruple play (e.g., adding IPTV, PSTN or mobile) combined with shared business support systems from a single operator or a service provider to a consumer. Demand for such converged services, combined with the convergence between wireless and fixed networks (e.g., broadband), further emphasizes the need to move away from silo-based architectures and instead rely on a horizontal, standards-based platform that enables convergence.

In telecommunications, service providers not only deal with the networks assets, platforms, and services, but must also support business processes to provide services to their customers and interact with their partners and suppliers, as well as operational processes to monitor and administer these assets. Tools, infrastructure, data repositories, and applications for performing these tasks are referred to as service provider business support systems (BSS) and operational support systems (OSS). BSS typically includes resources that support the business aspects (e.g. CRM, PRM, ERP, Analytics, financial, revenue management) while OSS supports the execution of the business with aspects like monitoring, management, and administration; resolution of trouble; billing and/or charging; provisioning; activation; fulfillment; etc.) In any service provider, services and run-time interact with OSS and BBS. Today, OSS and BSS are often complex archaic systems designed for legacy networks where services, hardware, and network resources consist mainly of static components.

IMS has been of interest to service providers because IMS promises interoperability out of the box with a prescribed deployment architecture and a 'wall garden' that allows SP viable business models. However, IMS is just one Next Generation Network option of many, including vanilla IETF SIP (Internet/intranet) to pre-IMS. IMS has been referred to as rigid, complex, and costly, and it has not yet been widely deployed. IMS will probably evolve, and less stringent evolutionary systems will probably be available that support IMS-like services, such as push-to-talk over cellular without full IMS deployment. However, there is a need for systems and processes that can attain convergence but which do not require re-hosting, re-architecting, or recapitalizing as IMS is perceived to require.

BRIEF SUMMARY OF THE INVENTION

Systems and methods in accordance with various embodiments can overcome deficiencies in IMS by providing abstracted services and identity and subscription information beyond their access networks and handling user authentication and subscription information for the services in an abstract identity manager.

In one embodiment, a system of telecommunication networks and services comprises a plurality of telecommunications access networks having managed identities as well as a service abstracted from the access networks. The service is adapted to run on the access networks, and an operational support system (OSS) coupled to a business support system (BSS). The OSS and BSS are shared across the access networks, and the access networks have the same identity manager.

Another embodiment relates to a method of managing services on a plurality of different telecommunication networks. The method comprises providing an identity manager to a first telecommunications network and a second telecommunications network, and providing a telecommunications service to the first and second telecommunications networks. The method further comprises authenticating a user using the identity manager through the first telecommunications network, verifying that the user is subscribed to the service using the identity manager through the first telecommunications network, verifying that the user is allowing the user to access the service on the first telecommunications network, authenticating the user using the identity manager through the second telecommunications network, verifying that the user is subscribed to the service using the identity manager through the second telecommunications network, and allowing the user to access the service on the second telecommunications network.

A further understanding of the nature and advantages of the inventions disclosed herein may be realized by references of the remaining portions of the specification and the attached drawings.

DETAILED DESCRIPTION OF THE INVENTION

Systems and methods in accordance with various embodiments can overcome aforementioned and other deficiencies in existing systems such as IMS by using an abstraction layer for services, user authorization for those services, and subscription confirmation for those services.

As described, it is possible to implement a system where telecommunications services can be deployed on legacy, current, future, and variations of telecommunications networks and have the services co-exist.

For true convergence, a Service Delivery Platform (SDP) in accordance with U.S. Pat. No. 7,167,705 (incorporated by reference above) can be used that abstracts network technologies and is extensible as needed in the service layer with or without IMS. The capability to recognize, authenticate, and manage (e.g. federate) the identity of users across different channels can be addressed with identity management across network and service layers (middleware/DSP and applications). The capability to share the management of user information and assets (e.g. subscriptions, bills, assets) can be achieved by ensuring that an Operations Support System (OSS)/Business Support System (BSS) is shared across channels and relies upon the same identity manager. This can be achieved by integrating OSS/BSS with a service layer following U.S. patent application Ser. No. 12/019,335 filed Jan. 24, 2008 (incorporated by reference above).

With SDP and context in a horizontal service layer, service continuity is achievable when network/radio continuity is supported. For example, Voice Call Continuity (VCC) in the service layer can be achieved with approximately five function calls with many customizable features (e.g. criteria for switches or ways to implement the switch, involved clients). An example use case is to switch phone calls or a media session on a device when on a switch radio network or from device to device across a radio network. A service level Smart Common Input Method (SCIM) for IMS provides the same composition on Internet IMS as well as legacy networks.

Figure 1:
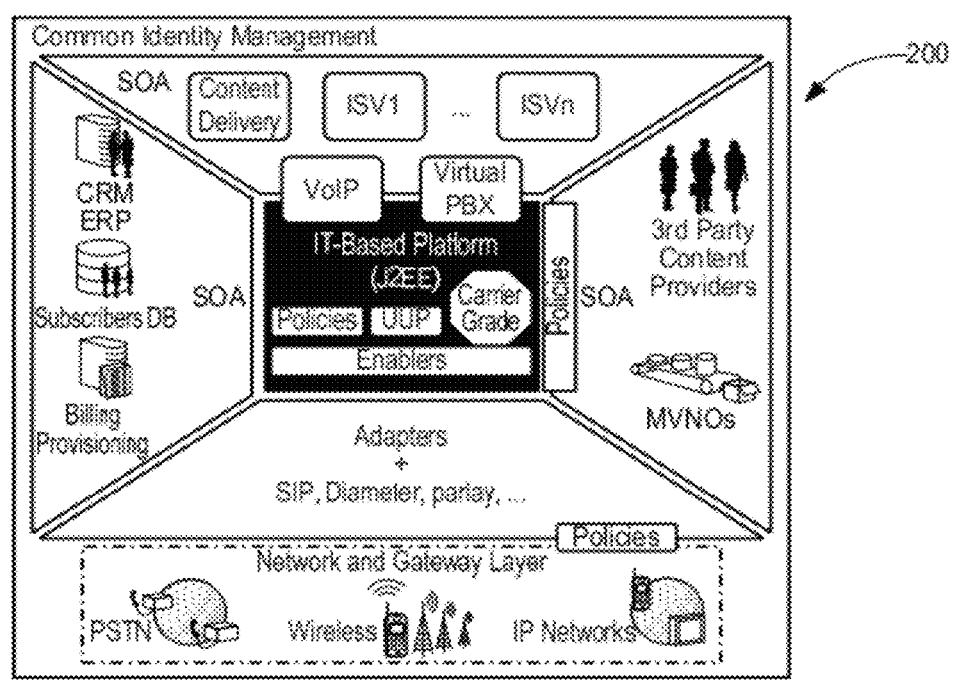
FIG. 1 illustrates a Service Delivery Platform (SDP) architecture in accordance with an embodiment.

In FIG. 1, SDP architecture 200 implements an example of the desired functionality on top of an underlying J2EE core provided by the application server. It is valuable to have a common identity managed across all the elements and the network, as well as a common view of all the data about a principal. A basic approach to providing a service delivery platform starts with a standards-based IT platform (e.g. J2EE) and makes the platform carrier grade, and extends beyond HTTP to protocols such as SIP, Diameter, and Parlay. To support the key protocols relevant to Telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA then can be used to provide services such as revenue generating services, utilizing SOA-based policies and business rules (e.g. from third parties). The platform then can provide for SOA-based integration of OSS, BSS, and SDP. Exposure to third party content and service provider can be achieved by SOA to expose, integrate and enforce policies. SOA also can be used to also support and rationalize policy management and evaluation throughout the service provider environment.

In one embodiment, the service delivery platform (SDP) is a standards-based horizontal platform that abstracts the underlying network resources and follows a service-oriented architecture (SOA). The platform can be an SOA platform based on J2EE which includes a J2EE converged container and exposes various communication enablers. Enablers can include, for example, call control enablers and media server control enablers as discussed elsewhere herein. Further, interfaces can be exposed to applications and other enablers and resources for usage of various functionality. Some or all of the interfaces can be standard or standardizable, as is its behavior, such as may include Open Mobile Alliance (OMA), Parlay, Parlay X, and WS components. For the purpose of the SDP, these enablers can provide various MVC (Mobile/Voice/Communications) functionality. The applications can be built using one or more enablers, and can add notions like a user interface (UI), user management, and charging, either in the code or via delegation and orchestration.

In certain embodiments, the SDP (or the runtime for the network) and the OSS/BSS components utilize, are developed for using, or are compatible to use the same managed identity so that, independent of the particular network, it can be ensured that the user is the same, and the user identity can be managed appropriately across different networks. Often current systems perform identity management at the network layer, or maybe at the service level when the identity is exposed to a third party. Unfortunately, those two identities are rarely linked and managed, and further there is no existing link with the OSS/BSS components as the components exist in a separate layer or environment. Systems and methods in accordance with the various embodiments can combine these components using a service-oriented architecture (SOA), and build the components on the same stack so that they can share managed identities.

By integrating components such as SDP, OSS, and BSS components, an end-to-end integration can be provided that enables consistent OSS/BSS/SDP coexistence across multiple network technologies, enabling evolutionary deployments of NGNs, as well as enabling consistent OSS/BSS/SDP and service sharing across multiple network technologies or providers, enabling true convergence. Such an approach also provides for business-driven management with almost zero touch of all the service provider systems.

Figure 2:
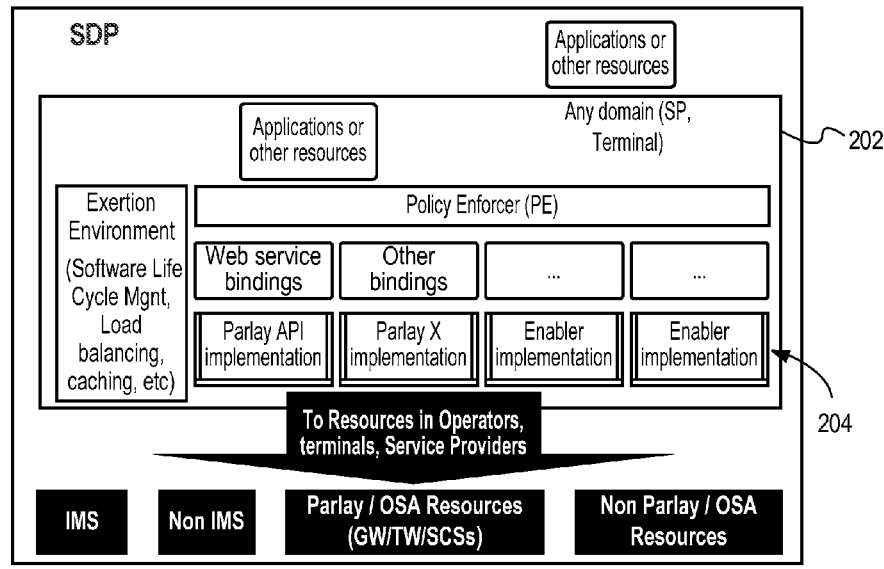
FIG. 2 illustrates an SDP in accordance with an embodiment.
Figure 3:
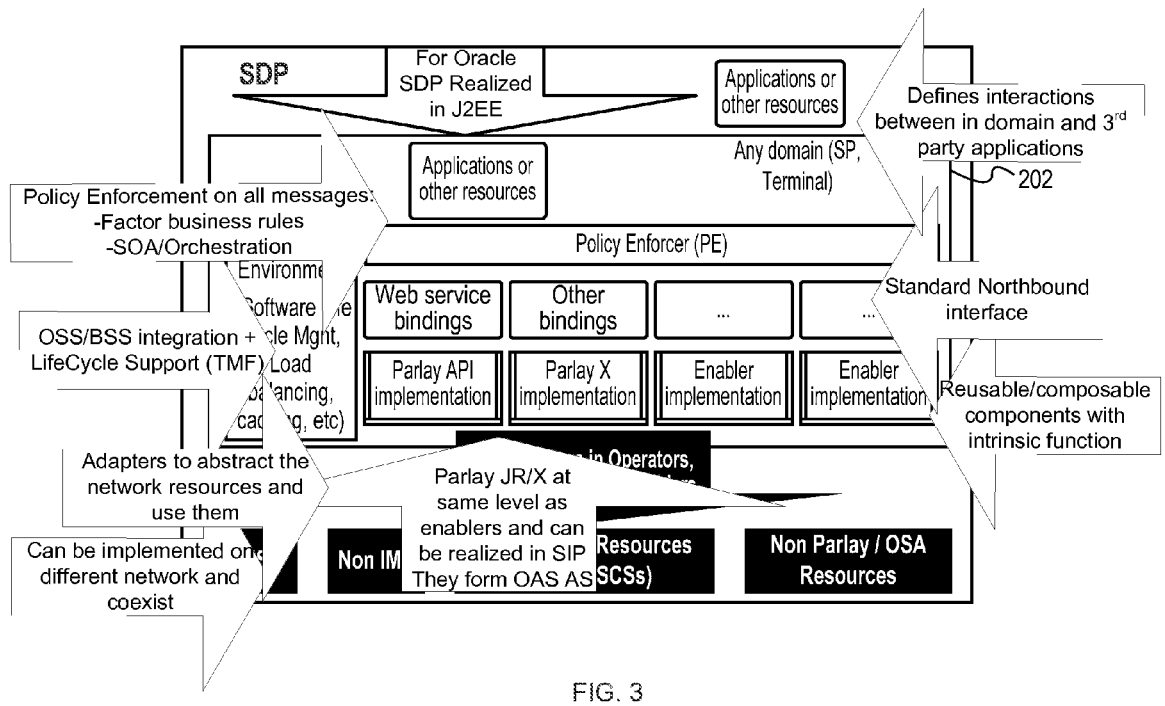
FIG. 3 illustrates the SDP of FIG. 2 with annotations.

With reference to FIGS. 1-3, Service Delivery Platform (SDP) 202 in SDP architecture 200 in accordance with an embodiment is a horizontal platform for the service layer that abstracts underlying network resources. The SDP follows a service-oriented architecture and realizes the blueprint (see FIGS. 2-3) which factors out business rules, provides mobile voice and communication features, and is positioned with respect to IMS and Legacy/Parlay as an SDP in U.S. Pat. No. 7,167,705 (see above). The SDP has converged SIP AS and OSA AS within the IT platforms and telephony AS, and supports end to end integration with the OSS/BSS. It is preferable that the SDP is standard based and is implemented in Java EE (formerly Java 2 Platform, Enterprise Edition (J2EE)) and has a service-oriented architecture.

A service delivery platform such as is illustrated in FIGS. 1-3 can build upon a standards based IT platform, such as an underlying J2EE core, and can make the platform carrier grade. The SDP can extend support beyond IP HTTP to support key protocols for telecommunications, for example, such as SIP/ISC, Diameter, and Parlay CORBA, for example, as well as adapters to messaging gateways. A standard or generic approach can be used to build adapters to any other resource or protocol using JCA 1.5. An SDP also can provide enablers as reusable components that abstract network resources and northbound interfaces. Services such as revenue services can be provided via IT and/or SOA functionality. The SDP also can provide support for SOA-based policies and business rules, as well as SOA-based integration of domains such as OSS domains with the SDP domain.

In certain embodiments, the SDP (or the runtime for the network) and the OSS/BSS components utilize, are developed for using, or are compatible to use the same managed identity so that, independent of the particular network, it can be ensured that the user is the same, and the user identity can be managed appropriately across different networks. Systems and methods in accordance with the various embodiments can combine components such as OSS/BSS components using a service oriented architecture (SOA) and an event driven architecture (EDA), and build the components on the same stack, or at least on a same identity framework, so that they can share managed identities.

Figure 4:
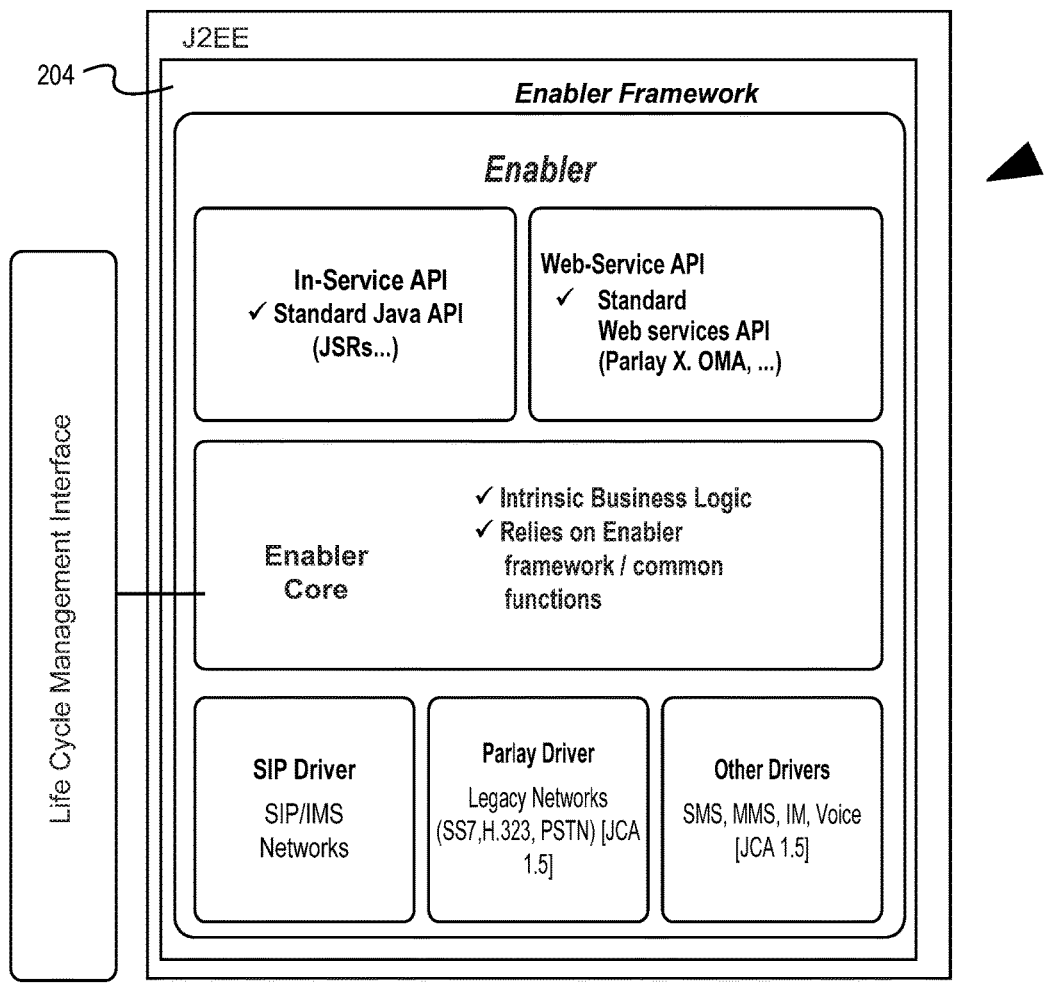
FIG. 4 illustrates an Enabler of FIG. 2.

FIG. 4 illustrates an Enabler implementation of FIG. 2. Preferably, enabler 204 is a reusable and composable Java EE object which exposes useful intrinsic functions (e.g. call control, presence, messaging, charging media server control, voice access, Unified User Profile (UUP), PEEM, resource management). Enabler can have a standardized 'northbound' Application Programming Interface (API) implemented in Java or an API oriented for Web Services. Enabler 204 abstracts network resources via adapters to network and platform elements using standard techniques (e.g. SIP, JCA 1.5). Enabler 204 can have common functions with other enablers, such as HA, persistence, management, logging, security, life cycle, support, etc.

Figure 5:
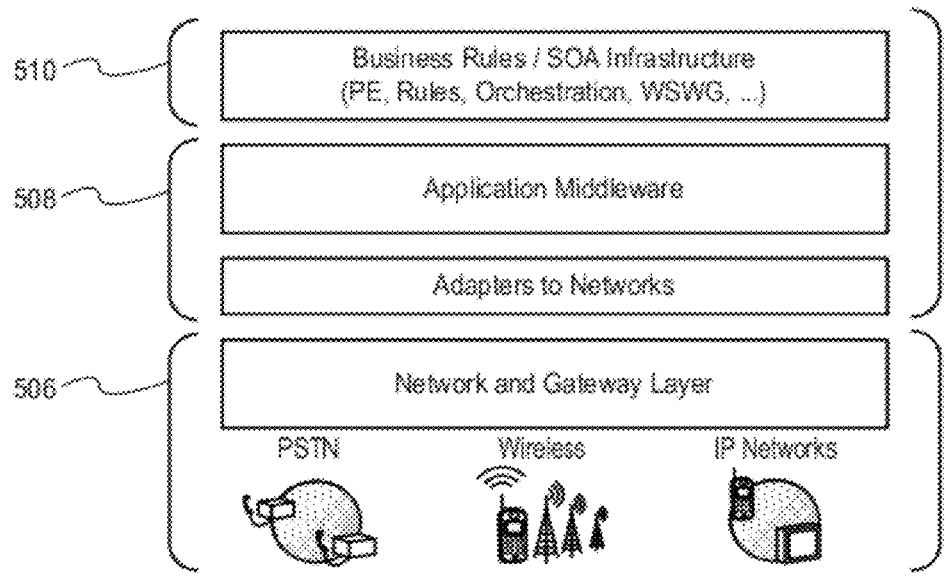
FIG. 5 illustrates a service-oriented architecture (SOA) in accordance with an embodiment.

FIG. 5 illustrates a service-oriented architecture (SOA) in accordance with an embodiment. Network and gateway layers 506 have one or more telecommunications networks, such as Public Switched Telephone Network (PSTN), wireless, and Internet Protocol (IP) packet-switched networks. Application middleware and adapters layers 508 control execution and management independent of business rules (above) and the networks (below). Business rules layer 510 conforms to a service-oriented architecture.

Figure 6:
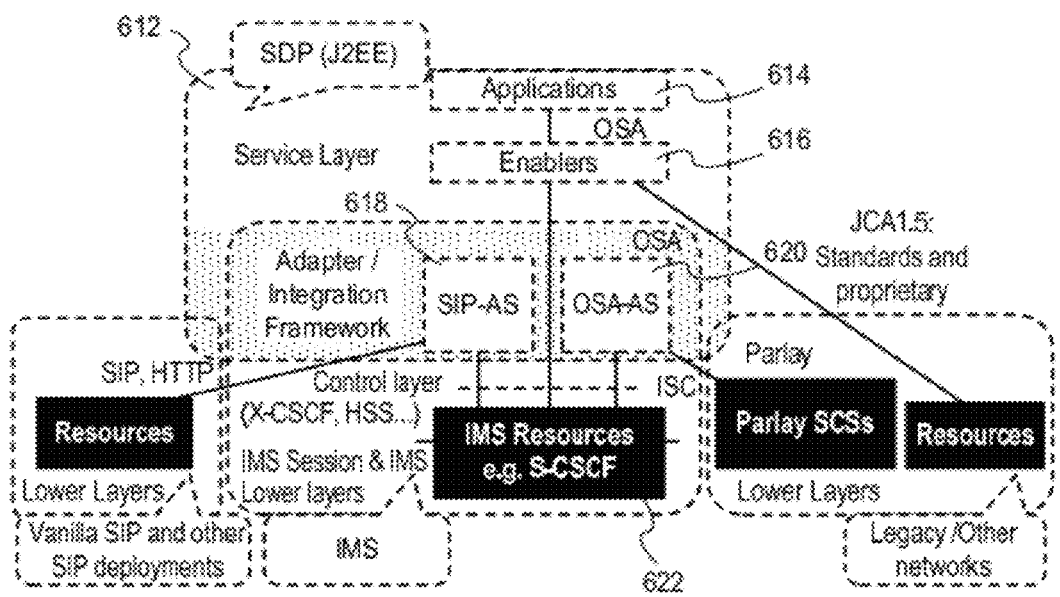
FIG. 6 illustrates an architecture in accordance with an embodiment.

FIG. 6 illustrates integration with IP Multimedia System (IMS) and legacy networks. A service layer 612, managed by an SDP, includes applications 614 and enablers 616 with a service-oriented architecture. Both SIP-AS 618 (Session Initiation Protocol-Accounting System) and OSA-AS 620 (Open Solutions Alliance-Accounting System), which are classified within the service layer but also counted in the adaptor/integration framework, communicate with IMS Resources 622 (e.g. Serving-Call Session Control Function (S-CSCF)) in a control layer. SIP-AS also communicates with SIP and Hypertext Transfer Protocol (HTTP) and Session Initiation Protocol (SIP) Resources, while OSA-AS communicates with Parlay Service Capability Servers (SCS) and other resources. IMS may co-exist with the above implementation.

Figure 7:
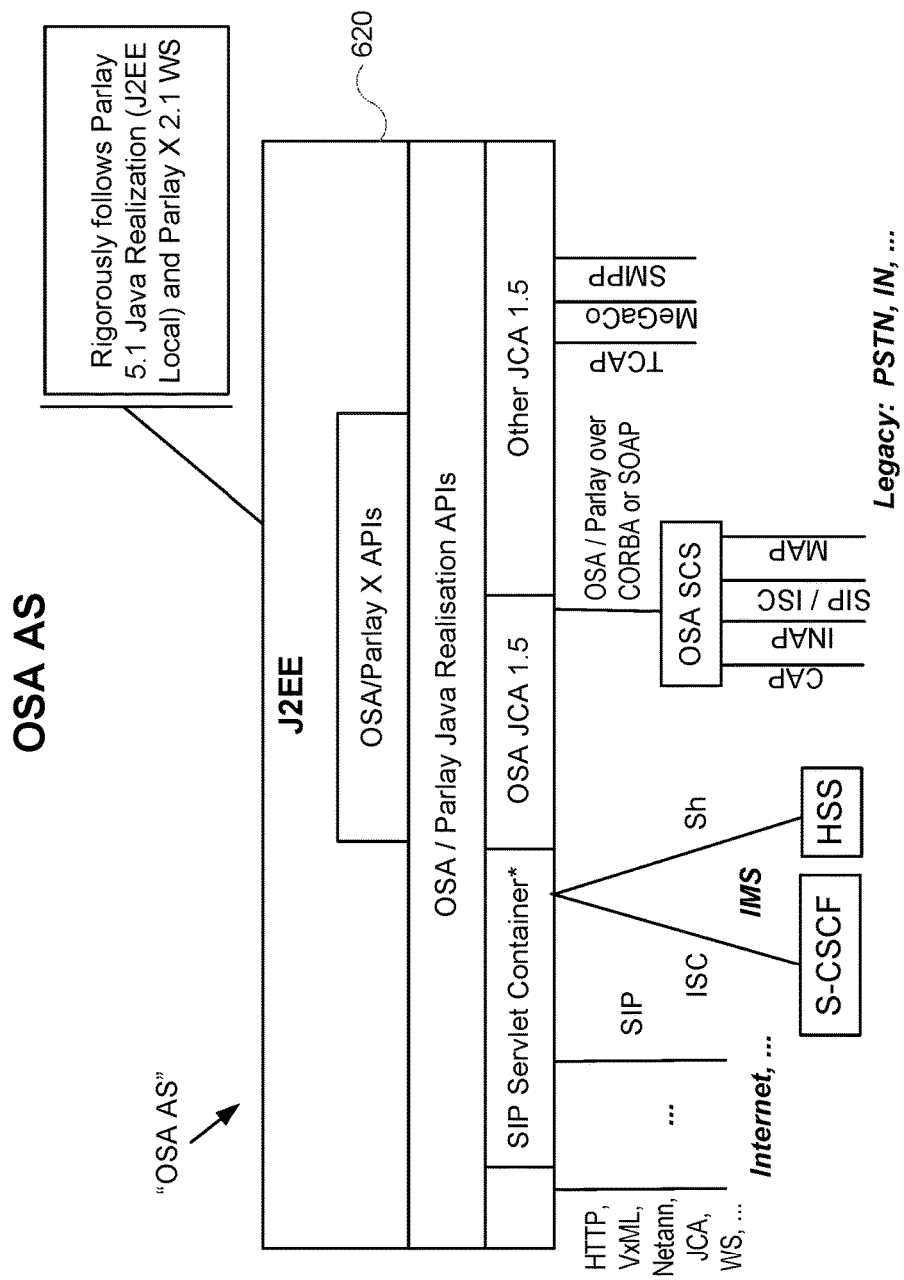
FIG. 7 illustrates an Open Solutions Alliance (OSA) Accounting System (AS) in accordance with an embodiment.

With reference to FIG. 7, OSA-AS 620 includes OSA/Parlay X APIs overlaid on OSA/Parlay Java Realization APIs with interfaces to SIP Servlets, OSA JCA 1.5, and other JCA 1.5 (J2EE Connector Architecture) components.

Figure 8:
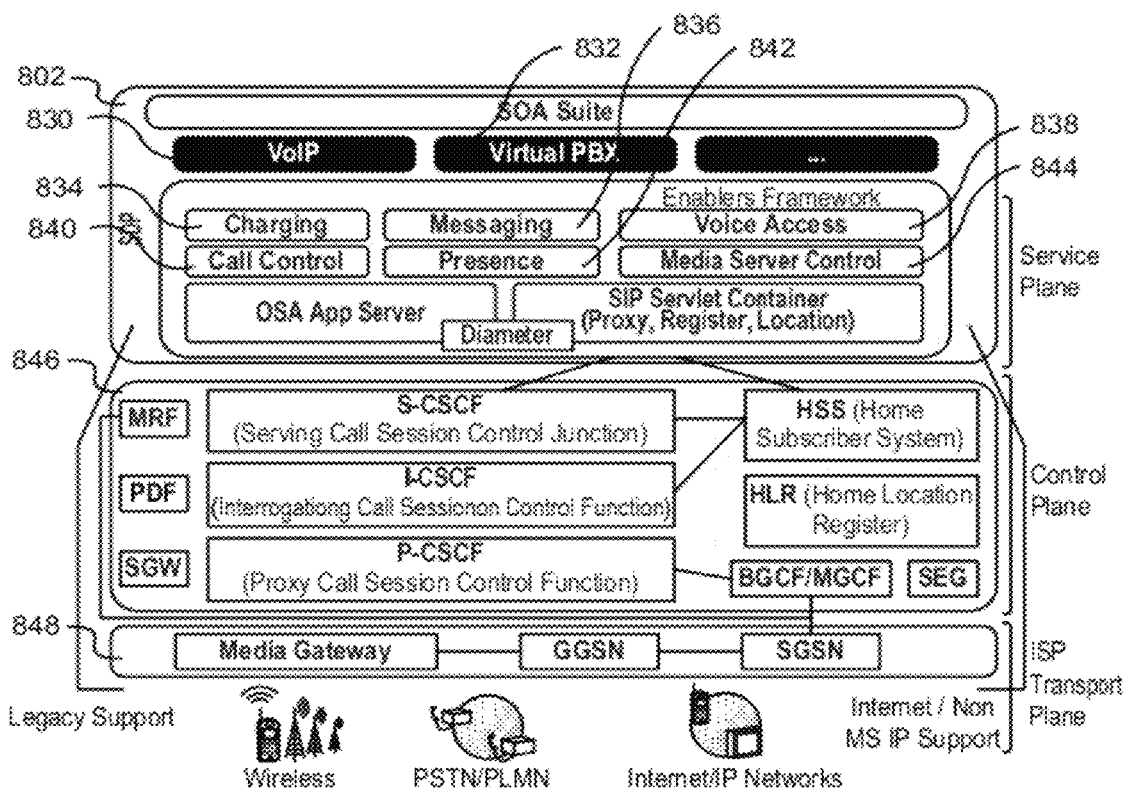
FIG. 8 illustrates an SDP positioned with respect to telecommunications networks in accordance with an embodiment.

With reference to FIG. 8, SDP 202 has a suite of service-oriented architecture services, including Voice over Internet Protocol (VoIP) service 830 and Virtual Private Branch Exchange Service (Virtual PBX) 832. SDP 202 also has charging service 834, messaging service 836, voice access service 838, call control service 840, presence service 842, and media server control 844.

SDP 202 communicates with lower lying control plane 846 via a Diameter session. Diameter can call a Serving-Call Session Control Function (S-CSCF), Interrogating-Call Session Control Function (I-CSCF), or Proxy-Call Session Control Function (P-CSCF), which in turn communicate with a Home Subscriber System (HSS) (S-CSCF and I-CSCF) or Breakout Gateway Control Function/Media Gateway Control Function (BGCF/MGCF) (P-CSCF). Provisions for a Security Gateway (SEG) may also be included.

S-CSCF communicates through a Multimedia Resource Function (MRF) with IP transport plane 848. P-CSCF can communicate to transport plane 848 directly or through BGCF/MGCF. Serving GPRS Support Node (SGSN) accepts commands and routes messages through the Internet or IP networks. SGSN can also forward and format commands and messages to a Gateway GPRS Support Node (GGSN) for a PSTN/PLMN (Public Land Mobile Network) or media gateway for wireless telecommunication networks.

Figure 9:
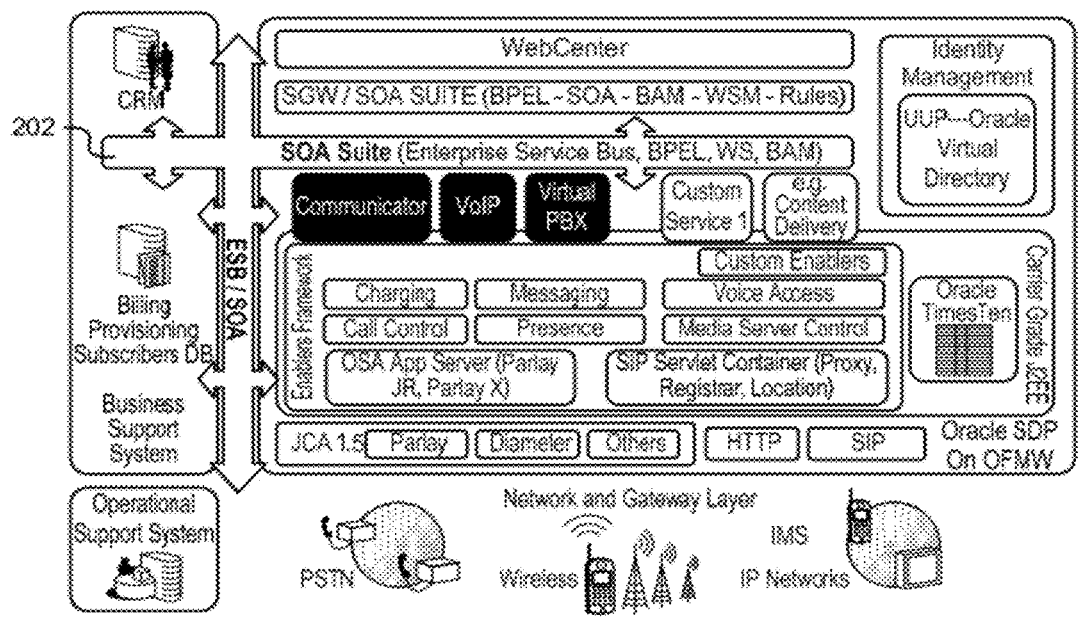
FIG. 9 illustrates an SDP architecture in accordance with an embodiment.

FIG. 9 illustrates an SDP architecture in accordance with an embodiment, showing where the SOA Suite of SDP can fit in to an SDP architecture.

Figure 10:
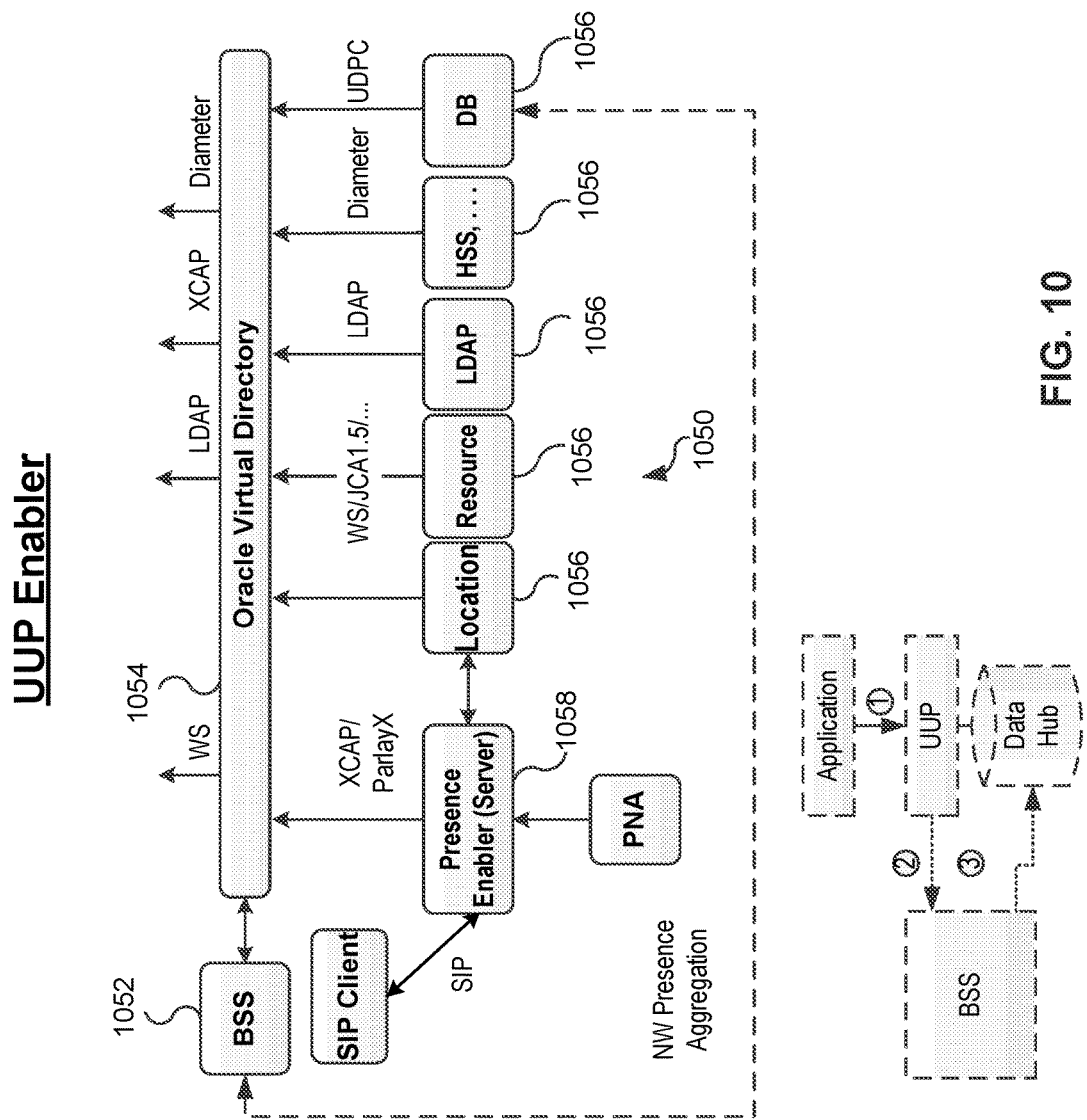
FIG. 10 illustrates a Unified User Profile (UUP) Enabler in accordance with an embodiment.

FIG. 10 illustrates Unified User Profile (UUP) enablers in accordance with an embodiment. UUP Enablers 1050 provide an identity managed virtual view of data about principals encountered in the SDP, such as credentials, BSS subscriptions, service specific data, etc. Enablers 1056 connect to virtual directory 1054 and BSS 1052. Presence enabler 1058, a computer server, manages a Session Initiation Protocol (SIP) client with relation to enablers 1056.

A UUP can include a service resource such as an enabler that provides an identity managed virtual view of all the data about principals encountered in the SDP, including information such as credentials, subscriptions, service-specific data, network data (e.g., HSS), dynamic data (e.g., presence and location information), and profile information. The UUP provides for customizable schema mapping and caching or pre-fetching of data. The UUP also allows northbound interfaces to be wrapped and/or transformed as needed. These northbound interfaces can include, for example, interfaces such as Java (e.g., JNDI, JAX RPC, JAX WS), SOAP/HTTP (e.g., Rg Interface), LDAP, Diameter (e.g., Sh/Dh, Cx/Dx), OMA GSSM, and XCAP (e.g., OMA XDM profile enabler) interfaces. The UUP also can support "southbound" protocols including LDAP, XCAP, JDBC, Custom/Web service, and Diameter (e.g., Sh/Dh, Cx/Dx, HSS, SLS) protocols. The UUP can support various IMS profiles, customer data models, subscriber management features including integration with OSS/BSS, and various administration features.

The whole platform can be used with identity management services. In one example, a UUP (unified user profile) built on a Virtual Directory offers an identity managed single view of the information about the subscribers (or other principles) from OSS (e.g. assets in inventory), BSS (e.g. bill and subscriptions), network (e.g. HSS via Sh), Dynamic information (e.g. presence or location) and any other service level specific information (e.g. credentials, and application or enabler data).

Figure 11:
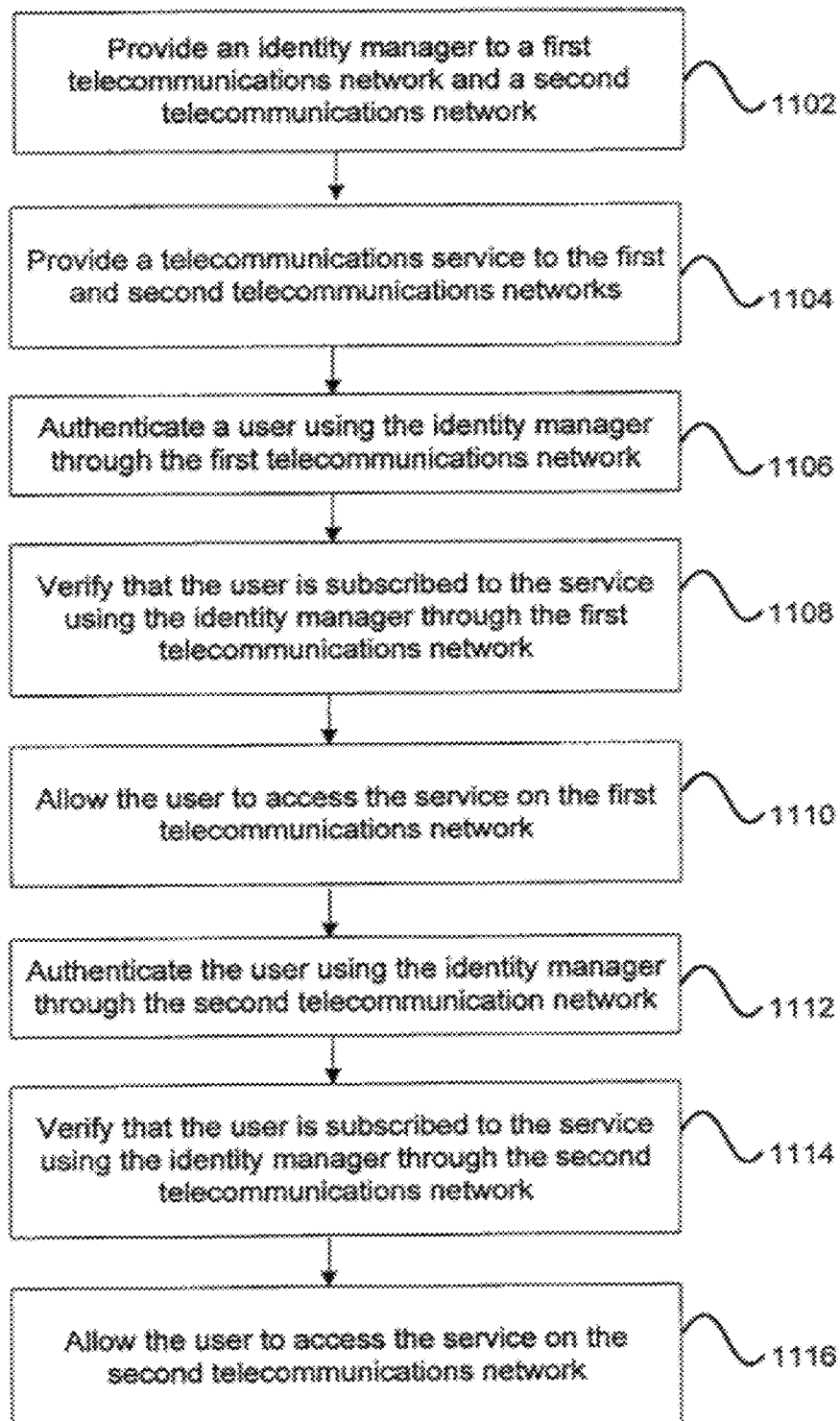
FIG. 11 illustrates a flowchart with operations in accordance with an embodiment.

FIG. 11 shows an example flowchart illustrating a process in accordance with one embodiment. In operation 1102, an identity manager is provided to a first telecommunications network and a second telecommunications network. In operation 1104, a telecommunications service is provided to the first and second telecommunications networks. In operation 1106, a user is authenticated using the identity manager through the first telecommunications network. In operation 1108, it is verified that the user is subscribed to the service using the identity manager through the first telecommunications network. In operation 1110, which occurs after the user is authenticated and the user's subscription is verified, the user is allowed to access the service on the first telecommunications network.

According to one embodiment, operations 1112, 1114, and 1116 are similar to operations 1106, 1108, and 1110, respectively, but performed on the second telecommunications network. Thus, the identity manager is used to authenticate the user and verify a common subscription of the user to the service on both the first and second telecommunications networks. The common subscription can be enabled by a BSS which is shared between the two telecommunications networks.

Alternatively, operations 1112, 1114, and 1116 may rely on operations 1106, 1108, and 1110. That is, rather than performing a separate authentication of the user on the second network, the second network and or the identity manager can rely on the authentication of the user on the first network, e.g., as a form of single sign-on. Regardless of whether done by the identity manager of the first network, second network, or both, authentication of the user can be used, for example, to authorize roaming (i.e., use authentication of the user by one or both of the identity managers to allow a service to be provided on one network to be made available to a subscriber of the other, possibly for an extra fee one a one time or per use basis), delivery of converged services (i.e., where a service is "extended" or continued across networks by either combining features from different networks of coordinating them to continue them from one or the other), etc.

Figure 12:
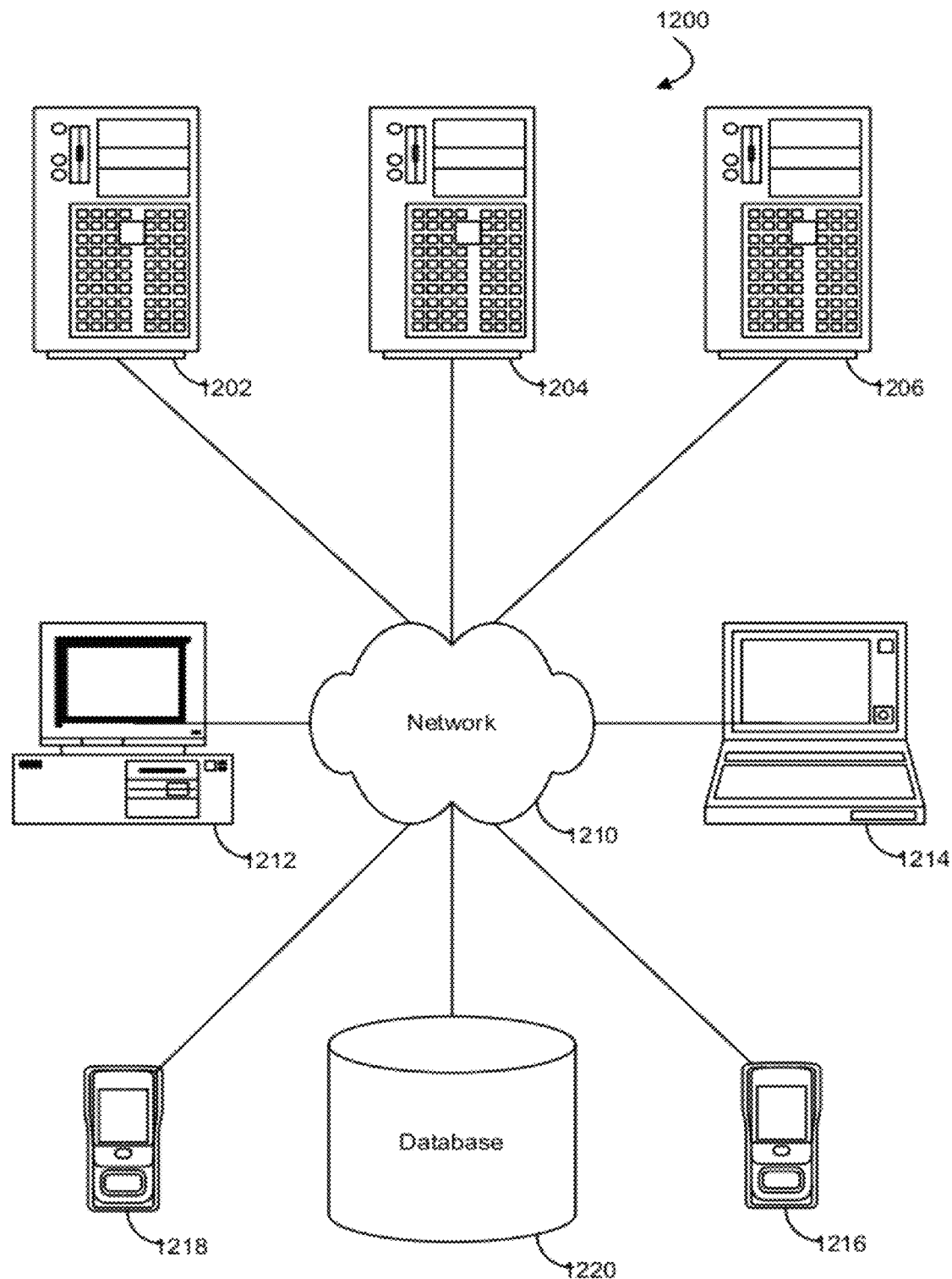
FIG. 12 illustrates components of a computer network that can be used in accordance with one embodiment of the present invention.

FIG. 12 is a block diagram illustrating components of an exemplary operating environment in which various embodiments of the present invention may be implemented. The system 1200 can include one or more user computers, computing devices, or processing devices 1212, 1214, 1216, 1218, which can be used to operate a client, such as a dedicated application, web browser, etc. The user computers 1212, 1214, 1216, 1218 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1212, 1214, 1216, 1218 may also have any of a variety of applications, including one or more development systems, database client and/or server applications, and Web browser applications. Alternatively, the user computers 1212, 1214, 1216, 1218 may be any other electronic device, such as a thin-client computer, Internet-enabled gaming system, and/or personal messaging device, capable of communicating via a network (e.g., the network 1210 described below) and/or displaying and navigating Web pages or other types of electronic documents. Although the exemplary system 1200 is shown with four user computers, any number of user computers may be supported.

In most embodiments, the system 1200 includes some type of network 1210. The network may can be any type of network familiar to those skilled in the art that can support data communications using any of a variety of commercially-available protocols, including without limitation TCP/IP, SNA, IPX, AppleTalk, and the like. Merely by way of example, the network 1210 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1202, 1204, 1206 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1206) may be dedicated to running applications, such as a business application, a Web server, application server, etc. Such servers may be used to process requests from user computers 1212, 1214, 1216, 1218. The applications can also include any number of applications for controlling access to resources of the servers 1202, 1204, 1206.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1212, 1214, 1216, 1218. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1212, 1214, 1216, 1218.

The system 1200 may also include one or more databases 1220. The database(s) 1220 may reside in a variety of locations. By way of example, a database 1220 may reside on a storage medium local to (and/or resident in) one or more of the computers 1202, 1204, 1206, 1212, 1214, 1216, 1218. Alternatively, it may be remote from any or all of the computers 1202, 1204, 1206, 1212, 1214, 1216, 1218, and/or in communication (e.g., via the network 1210) with one or more of these. In a particular set of embodiments, the database 1220 may reside in a storage-area network ("SAN") familiar to those skilled in the art. Similarly, any necessary files for performing the functions attributed to the computers 1202, 1204, 1206, 1212, 1214, 1216, 1218 may be stored locally on the respective computer and/or remotely, as appropriate. In one set of embodiments, the database 1220 may be a relational database, such as Oracle 10 g, that is adapted to store, update, and retrieve data in response to SQL-formatted commands.

Figure 13:
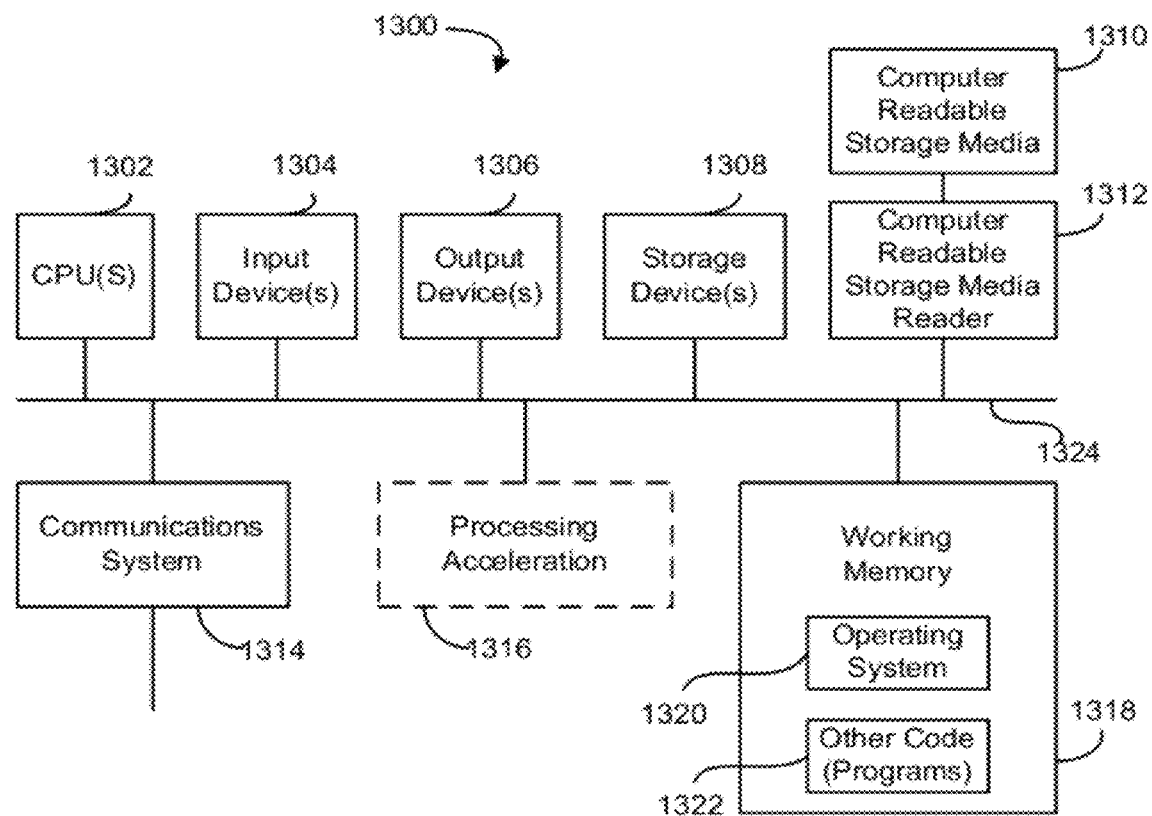
FIG. 13 illustrates components of a computerized device that can be used in accordance with one embodiment of the present invention.

FIG. 13 illustrates an exemplary computer system 1300, in which various embodiments of the present invention may be implemented. The system 1300 may be used to implement any of the computer systems described above. The computer system 1300 is shown comprising hardware elements that may be electrically coupled via a bus 1324. The hardware elements may include one or more central processing units (CPUs) 1302, one or more input devices 1304 (e.g., a mouse, a keyboard, etc.), and one or more output devices 1306 (e.g., a display device, a printer, etc.). The computer system 1300 may also include one or more storage devices 1308. By way of example, the storage device(s) 1308 can include devices such as disk drives, optical storage devices, solid-state storage device such as a random access memory ("RAM") and/or a read-only memory ("ROM"), which can be programmable, flash-updateable and/or the like.

The computer system 1300 may additionally include a computer-readable storage media reader 1312, a communications system 1314 (e.g., a modem, a network card (wireless or wired), an infra-red communication device, etc.), and working memory 1318, which may include RAM and ROM devices as described above. In some embodiments, the computer system 1300 may also include a processing acceleration unit 1316, which can include a digital signal processor DSP, a special-purpose processor, and/or the like.

The computer-readable storage media reader 1312 can further be connected to a computer-readable storage medium 1310, together (and, optionally, in combination with storage device(s) 1308) comprehensively representing remote, local, fixed, and/or removable storage devices plus storage media for temporarily and/or more permanently containing, storing, transmitting, and retrieving computer-readable information. The communications system 1314 may permit data to be exchanged with the network and/or any other computer described above with respect to the system 1300.

The computer system 1300 may also comprise software elements, shown as being currently located within a working memory 1318, including an operating system 1320 and/or other code 1322, such as an application program (which may be a client application, Web browser, mid-tier application, RDBMS, etc.). It should be appreciated that alternate embodiments of a computer system 1300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A system of telecommunication networks and services comprising:
    a plurality of disparate telecommunications access networks, each of the plurality of disparate telecommunications access networks providing access for each user in a set of users, each user having a different managed identity on each of the plurality of disparate telecommunications access networks;
    a service abstracted from the plurality of disparate telecommunications access networks, the service adapted to run on the plurality of disparate telecommunications access networks; and
    a business support system (BSS);
    an operational support system (OSS) coupled to the BSS, the OSS and BSS being shared across the plurality of disparate telecommunications access networks and enabling a subscription to the service; and
    an identity manager that is accessible through the plurality of disparate telecommunications access networks and shared across the plurality of disparate telecommunications access networks, the OSS, and the BSS, wherein:
        the identity manager maintains a unified profile for each user in the set of users;
        the unified profile for each user in the set of users maps the different managed identity of the user on each of the disparate telecommunications access networks to a unified identity; and
        the identity manager:
            authenticates a user in the set of users requesting the service through one of the plurality of disparate telecommunications access networks using the unified identity for the user;
            determines whether the user is subscribed to the service; and
            makes available to the service the determination of whether the user is subscribed to the service, wherein:
                the unified identity provides a federated, common identity of the user across the different managed identities of the user on the access networks including dynamic data and profile information; and
                the OSS, the BSS, and the identity manager are built on a same software stack that enables sharing of the unified identity of each user.

2. The system of claim 1 further comprising a service delivery platform having a service-oriented architecture, the service delivery platform comprising a voice over internet protocol service and a virtual private branch exchange service.

3. The system of claim 2 wherein the service delivery platform further comprises a charging service, a messaging service, a voice access service, a call control service, a user presence service, and a media server control service.

4. The system of claim 3 wherein the service delivery platform is implemented in Java.

5. The system of claim 1 wherein a first one of the plurality of disparate telecommunications access networks is a mobile network and a second one of the plurality of disparate telecommunications access networks is a fixed network.

6. The system of claim 1 wherein the service comprises voicemail.

7. The system of claim 1 wherein the service comprises conference calling.

8. The system of claim 1 wherein the service comprises call hunting.

9. A method of managing services on a plurality of different telecommunication networks, the method comprising:
providing an identity manager to a first telecommunications network and a second telecommunications network, wherein:
the identity manager comprises:
a business support system (BSS); and
an operational support system (OSS) coupled to the BSS, the OSS and BSS being shared across the first telecommunications network and the second telecommunications network;
the first telecommunications network and the second telecommunications network each provide access for each of two or more users of a set of users;
each of the two or more users has a different managed identity on the first telecommunications network and the second telecommunications network;
the identity manager maintains a unified profile for each of the two or more users;
the unified profile for each of the two or more users maps the different managed identities for each of the two or more users on the the first telecommunications network and the second telecommunications network to a unified identity;
each unified identity provides a federated, common identity of the two or more users across the different managed identities of the the two or more users on the first telecommunications network and the second telecommunications network including dynamic data and profile information; and
the OSS, the BSS, and the identity manager are built on a same software stack that enables sharing of the unified identity;
providing a telecommunications service to the first and second telecommunications networks;
authenticating a user in the two or more users using the identity manager and the unified identity for the user through the first telecommunications network;
verifying that the user is subscribed to the service using the identity manager through the first telecommunications network;
allowing the user to access the service on the first telecommunications network;
authenticating the user using the identity manager and the unified identity for the user through the second telecommunications network;
verifying that the user is subscribed to the service using the identity manager through the second telecommunications network; and
allowing the user to access the service on the second telecommunications network;
wherein the identity manager is used to authenticate the user and verify a common subscription of the user to the service on both the first and second telecommunications networks.

10. The method of claim 9 further comprising billing the user using the BSS for use of the service accessed through both the first and second telecommunications networks.

11. The method of claim 9 wherein the providing the telecommunications service is performed by a service delivery platform (SDP), the SDP adapted to control multiple different telecommunication services.

12. The method of claim 9 wherein the first telecommunications network is a mobile network and the second telecommunications network is a fixed network.

13. The method of claim 9 wherein the service is selected from the group consisting of voicemail, conference calling, and call hunting.

14. The method of claim 9, wherein authenticating the user using the identity manager through the second telecommunications network and verifying that the user is subscribed to the service using the identity manager through the second telecommunications network comprises using authentication and verification of the user using the identity manager of the first network as a single sign-on for the second telecommunications network.

15. The method of claim 9, wherein allowing the user to access the service on the second telecommunications network comprises allowing the user to roam to the second telecommunications network.

16. The method of claim 9, wherein allowing the user to access the service on the second telecommunications network comprises allowing the user to access converged services of the first telecommunications network and the second telecommunications network.

17. The system of claim 1, wherein the dynamic data includes presence information.

18. The system of claim 1, wherein the dynamic data includes location information.

19. The method of claim 9, wherein the dynamic data includes presence information.

20. The method of claim 9, wherein the dynamic data includes location information.

* * * * *

UNITED STATES PATENT AND TRADEMARK OFFICE
CERTIFICATE OF CORRECTION

PATENT NO. : 9,565,297 B2  
APPLICATION NO. : 13/029226  
DATED : February 7, 2017  
INVENTOR(S) : Maes Page 1 of 1

It is certified that error appears in the above-identified patent and that said Letters Patent is hereby corrected as shown below:

In the Specification

In Column 9, Line 18, delete "and or" and insert -- and/or --, therefor.

In Column 10, Line 6, delete "GRPS," and insert -- GPRS, --, therefor.

In the Claims

In Column 13, Line 32, in Claim 9, delete "the the" and insert -- the --, therefor.

In Column 13, Line 37, in Claim 9, delete "the the" and insert -- the --, therefor.

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*